(12) United States Patent
Fukuda et al.

(10) Patent No.: US 10,434,752 B2
(45) Date of Patent: Oct. 8, 2019

(54) ORGANIC GLASS LAMINATE COATED WITH INORGANIC OXIDE FILM

(71) Applicant: Dai Nippon Printing Co., Ltd., Tokyo (JP)

(72) Inventors: Shunji Fukuda, Tokyo (JP); Junichi Tamuki, Tokyo (JP); Wataru Saitou, Tokyo (JP); Kazuyuki Takasawa, Tokyo (JP); Taro Morimoto, Tokyo (JP); Keisuke Koyama, Tokyo (JP); Misato Kamei, Tokyo (JP); Masanao Matsuoka, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 143 days.

(21) Appl. No.: 15/528,837

(22) PCT Filed: Dec. 2, 2015

(86) PCT No.: PCT/JP2015/083904
§ 371 (c)(1),
(2) Date: May 23, 2017

(87) PCT Pub. No.: WO2016/088810
PCT Pub. Date: Jun. 9, 2016

(65) Prior Publication Data
US 2017/0320295 A1 Nov. 9, 2017

(30) Foreign Application Priority Data

Dec. 2, 2014 (JP) .................................. 2014-244523
Mar. 26, 2015 (JP) .................................. 2015-065209

(51) Int. Cl.
| | | |
|---|---|---|
| *B32B 17/06* | (2006.01) | |
| *B32B 9/04* | (2006.01) | |
| *B32B 27/18* | (2006.01) | |
| *B32B 27/30* | (2006.01) | |
| *B29C 45/14* | (2006.01) | |
| *B32B 37/14* | (2006.01) | |
| *B32B 37/00* | (2006.01) | |
| *B29K 669/00* | (2006.01) | |
| *B29L 31/30* | (2006.01) | |
| *B29K 69/00* | (2006.01) | |
| *B32B 37/24* | (2006.01) | |

(52) U.S. Cl.
CPC ............ *B32B 17/064* (2013.01); *B29C 45/14* (2013.01); *B29C 45/1418* (2013.01); *B29C 45/14811* (2013.01); *B32B 9/04* (2013.01); *B32B 27/18* (2013.01); *B32B 27/30* (2013.01); *B32B 37/025* (2013.01); *B32B 37/14* (2013.01); *B29C 2045/14844* (2013.01); *B29K 2069/00* (2013.01); *B29K 2669/00* (2013.01); *B29L 2031/3052* (2013.01); *B32B 2037/243* (2013.01); *B32B 2307/412* (2013.01); *B32B 2309/105* (2013.01); *B32B 2310/0831* (2013.01); *B32B 2605/006* (2013.01)

(58) Field of Classification Search
None
See application file for complete search history.

(56) References Cited

U.S. PATENT DOCUMENTS

| | | | |
|---|---|---|---|
| 2007/0212548 A1 | 9/2007 | Lefaux et al. | |
| 2008/0166569 A1 | 7/2008 | Gasworth et al. | |
| 2013/0309460 A1* | 11/2013 | Saitou | B05D 7/24 428/195.1 |
| 2016/0185987 A1* | 6/2016 | Saito | B32B 27/06 428/195.1 |

FOREIGN PATENT DOCUMENTS

| | | |
|---|---|---|
| JP | 2008-194993 A | 8/2008 |
| JP | 2009-529453 A | 8/2009 |
| JP | 2010-513103 A | 4/2010 |
| JP | 2011-016257 A | 1/2011 |
| JP | 2011-164363 A | 8/2011 |
| JP | 2013-212614 A | 10/2013 |
| JP | 2014-051013 A | 3/2014 |
| JP | 2014-205366 A | 10/2014 |
| JP | 2015-085675 A | 5/2015 |

OTHER PUBLICATIONS

International Search Report dated Mar. 8, 2017, issued for PCT/JP2015/083904.

* cited by examiner

*Primary Examiner* — Robert T Butcher
(74) *Attorney, Agent, or Firm* — Locke Lord LLP

(57) ABSTRACT

An objective of the present invention is to provide an organic glass laminate that exhibits excellent weathering resistance and abrasion resistance, and that can be used as an exterior member. This organic glass laminate comprises at least the following, in order: an organic glass base, a cured layer formed from the cured product of a resin composition, which comprises a curable resin and a UV absorber agent; and an inorganic oxide film. The glass transition temperature of the cured product which constitutes the cured layer is adjusted to 80-160° C., and the thickness of the inorganic oxide film is set to at least 0.01 μm and less than 0.5 μm, whereby weathering resistance and abrasion resistance are significantly improved, and the organic glass laminate is made suitable for use as an exterior member.

20 Claims, 7 Drawing Sheets

ORGANIC GLASS LAMINATE COATED WITH INORGANIC OXIDE FILM

TECHNICAL FIELD

The present invention relates to an organic glass laminate that is used as an exterior member. More specifically, the present invention relates to an organic glass laminate that is coated with an inorganic oxide film and provided with excellent weather resistance and abrasion resistance. Furthermore, the present invention relates to a laminating sheet for use in organic glass that is used for production of the organic glass laminate.

BACKGROUND ART

Conventionally, resin materials such as polycarbonate, polyacrylate, polymethyl methacrylate, polyethylene terephthalate, polyethylene naphthalate, polyolefin, and ABS are excellent in transparency and have a smaller weight than inorganic glass, so that these, as organic glass, are used as a substitute for inorganic glass in various fields. In particular, among these kinds of organic glass, polycarbonate is excellent in shock resistance, heat resistance, transparency, and the like, and is studied as organic glass that is used as an exterior member of a window or the like of an automobile.

On the other hand, as compared with inorganic glass, organic glass is inferior in terms of weather resistance and abrasion resistance, so that, in order to compensate for these drawbacks, lamination of a surface protective layer formed of a cured resin on the surface of organic glass is generally carried out. However, there are numerous demands for improvement of desired performance of the organic glass, so that mere lamination of a surface protective layer formed of a cured resin cannot follow or meet these demands. In particular, when organic glass is used as an exterior member, the organic glass is used in an environment in which the organic glass is exposed to wind, rainfall, and ultraviolet rays and is liable to undergo scratches, so that it is demanded to improve the weather resistance and abrasion resistance. Above all, with respect to organic glass for exterior member that is used in the field of automobiles, it is demanded to provide the organic glass with a further more excellent weather resistance and abrasion resistance from the viewpoint of safety, visibility and the like.

Therefore, it is proposed to improve the abrasion resistance and weather resistance of the organic glass by forming a cured layer of a curable resin and an inorganic oxide film such as silicon dioxide on the surface of the organic glass to form an organic glass laminate. For example, Patent Document 1 discloses an organic glass laminate in which a cured film is formed on the surface of a transparent or semitransparent plastic substrate by the wet method, and a plasma CVD layer is formed on the cured film under specific conditions. Further, Patent Document 2 discloses an organic glass laminate in which a first weather-resistant layer of polyurethane or polyurethane acrylate is formed on a plastic base material, and further a first abrasion-resistant layer of an inorganic substance such as silicon dioxide is formed on the first weather-resistant layer. In Patent Documents 1 and 2, it is assumed that the thickness of the inorganic oxide film is preferably 0.5 µm or more in view of providing the abrasion resistance. However, an inorganic oxide film having such a thickness requires a large amount of time for forming and moreover has a poor processability, so that cracks are liable to be generated when the inorganic oxide film is bent. Therefore, the inorganic oxide film must be formed directly on a molded organic glass, thereby disadvantageously leading to a complicated and cumbersome production process.

Furthermore, in a conventional organic glass laminate in which a cured layer and an inorganic oxide film are laminated, the inorganic oxide film may sometimes be delaminated by generation of cracks, so that the conventional organic glass laminate still has not been fully satisfactory in view of the weather resistance as well.

In view of the presence of such a conventional art as a background, it is eagerly demanded in an organic glass laminate used as an exterior member that a new technique capable of providing excellent weather resistance and abrasion resistance is developed.

PRIOR ART DOCUMENTS

Patent Documents

Patent Document 1: Japanese Patent Laid-open Publication No. 2011-16257
Patent Document 2: Japanese Translation of PCT International Application Publication No. 2010-513103

SUMMARY OF THE INVENTION

Problems to be Solved by the Invention

An object of the present invention is to provide an organic glass laminate that is provided with excellent weather resistance and abrasion resistance and used as an exterior member. Further, an object of the invention is to provide a laminating sheet for use in organic glass that is used for conveniently producing the organic glass laminate.

Means for Solving the Problems

The present inventors have made eager studies in order to solve the aforementioned problems and have found out that, in an organic glass laminate having at least an organic glass base substrate, a cured layer, and an inorganic oxide film in this order, the cured layer being formed of a cured product of a resin composition containing a curable resin and an ultraviolet absorbent, weather resistance and abrasion resistance are significantly improved, and the organic glass laminate is made suitable for use as an exterior member by adjusting the glass transition point of the cured product constituting the cured layer to 80-160° C. and setting the thickness of the inorganic oxide film to 0.01 µm or more and less than 0.5 µm. Further, the organic glass laminate is excellent in the property of following a bending process, so that, even when the organic glass laminate is subjected to a bending process, delamination of the inorganic oxide film and generation of cracks can be suppressed, thereby providing an excellent processability. Furthermore, the present inventors have found out that the organic glass laminate can be conveniently produced by using a laminating sheet for use in organic glass in which at least the cured layer or at least the cured layer and the inorganic oxide film are laminated on a base material film. The present invention has been completed by further repeating studies on the basis of these findings.

That is, the present invention provides inventions of the modes mentioned below.

Item 1. An organic glass laminate used as an exterior member, the organic glass laminate having at least an organic glass base substrate, a cured layer, and an inorganic oxide film in this order, the cured layer being formed of a cured product of a resin composition containing a curable resin and an ultraviolet absorbent, wherein the cured product has a glass transition point of 80-160° C., and the inorganic oxide film has a thickness of 0.01 µm or more and less than 0.5 µm.

Item 2. The organic glass laminate according to Item 1, wherein the glass transition point of the cured product is 90-150° C.

Item 3. The organic glass laminate according to Item 1 or 2, wherein the curable resin is an ionizing-radiation-curable resin.

Item 4. The organic glass laminate according to Item 3, wherein the ionizing-radiation-curable resin is a combination of (i) a tri- or more functional (meth)acrylate and (ii) a bifunctional (meth)acrylate.

Item 5. The organic glass laminate according to Item 4, wherein the (i) tri- or more functional (meth)acrylate is a tri- or more functional urethane (meth)acrylate, and the (ii) bifunctional (meth)acrylate is (ii-1) a bifunctional caprolactone-modified urethane acrylate, (ii-2) a (meth)acrylate in which two (meth)acryloyl groups are bonded to one alicyclic ring or aliphatic heterocyclic ring directly or via a linker region having a molecular weight of 200 or less and/or (ii-3) a bifunctional urethane (meth)acrylate in which two (meth)acryloyl groups are bonded to an aliphatic chain via a urethane bond.

Item 6. The organic glass laminate according to any one of Items 1 to 5, wherein the cured layer contains filler particles at 20-70% by mass.

Item 7. The organic glass laminate according to any one of Items 1 to 6, wherein the cured layer has a thickness of 1-10 µm.

Item 8. The organic glass laminate according to any one of Items 1 to 7, wherein the resin composition contains the ultraviolet absorbent at 0.5-10 parts by mass per 100 parts by mass of a total amount of the ionizing-radiation-curable resin.

Item 9. The organic glass laminate according to any one of Items 1 to 8, wherein the inorganic oxide film is a silicon oxide film.

Item 10. The organic glass laminate according to any one of Items 1 to 9, further having an adhesive layer and a primer layer in this order, as viewed from the organic glass base substrate side, between the organic glass substrate and the cured layer.

Item 11. The organic glass laminate according to Item 10, wherein the glass transition point of the primer layer is lower than the glass transition point of the cured product constituting the cured layer.

Item 12. The organic glass laminate according to any one of Items 1 to 11, further having a colored layer that has been partially formed between the organic glass base substrate and the inorganic oxide film.

Item 13. A laminating sheet for use in organic glass used for producing the organic glass laminate according to any one of Items 1 to 12, wherein, in the laminating sheet for use in organic glass, at least a cured layer is laminated on a base material film, the cured layer is formed of a cured product of a resin composition containing a curable resin and an ultraviolet absorbent, and the cured product has a glass transition point of 80-160° C.

Item 14. The laminating sheet for use in organic glass according to Item 13, wherein the base material film is a release film layer capable of being released from the cured layer, and the laminating sheet for use in organic glass is used for transferring the cured layer onto the organic glass base substrate.

Item 15. The laminating sheet for use in organic glass according to Item 14, wherein the release film layer, the cured layer, a primer layer, and an adhesive layer are laminated in this order.

Item 16. The laminating sheet for use in organic glass according to Item 15, further having a colored layer that has been partially formed between the release film layer and the cured layer and/or between the cured layer and the primer layer and/or on a surface of the adhesive layer that is on the side opposite to the primer layer.

Item 17. The laminating sheet for use in organic glass according to Item 13, wherein the base material film is a transparent resin film layer, and the laminating sheet for use in organic glass is used by laminating the laminating sheet for use in organic glass itself onto the organic glass base substrate.

Item 18. The laminating sheet for use in organic glass according to Item 17, wherein the resin film layer, a primer layer, and the cured layer are laminated in this order.

Item 19. The laminating sheet for use in organic glass according to Item 18, further having a colored layer that has been partially formed between the resin film layer and the primer layer and/or between the primer layer and the cured layer.

Item 20. Use of a laminating sheet for use in organic glass for producing an organic glass laminate according to any one of Items 1 to 12, wherein, in the laminating sheet for use in organic glass, at least a cured layer is laminated on a base material film, the cured layer is formed of a cured product of a resin composition containing a curable resin and an ultraviolet absorbent, and the cured product has a glass transition point of 80-160° C.

Item 21. A laminating sheet for use in organic glass used for producing the organic glass laminate according to any one of Items 1 to 12, wherein, in the laminating sheet for use in organic glass, at least a cured layer and an inorganic oxide film are laminated on a base material film, the cured layer is formed of a cured product of a resin composition containing a curable resin and an ultraviolet absorbent, the cured product has a glass transition point of 80-160° C., and the inorganic oxide film has a thickness of 0.01 µm or more and less than 0.5 µm.

Item 22. The laminating sheet for use in organic glass according to Item 21, wherein the base material film is a release film layer capable of being released from the inorganic oxide film, at least the inorganic oxide film and the cured layer are laminated in this order on the release film layer, and the laminating sheet for use in organic glass is used for transferring the cured layer and the inorganic oxide film onto the organic glass base substrate.

Item 23. The laminating sheet for use in organic glass according to Item 22, wherein the release film layer, the inorganic oxide film, the cured layer, a primer layer, and an adhesive layer are laminated in this order.

Item 24. The laminating sheet for use in organic glass according to Item 23, further having a colored layer that has been partially formed between the inorganic oxide film and the cured layer and/or between the cured layer and the primer layer and/or on a surface of the adhesive layer that is on the side opposite to the primer layer.

Item 25. The laminating sheet for use in organic glass according to Item 21, wherein
the base material film is a transparent resin film layer,
at least the inorganic oxide film and the cured layer are laminated on the resin film layer, and
the laminating sheet for use in organic glass is used by laminating the laminating sheet for use in organic glass itself onto the organic glass base substrate.

Item 26. The laminating sheet for use in organic glass according to Item 25, wherein the resin film layer, a primer layer, the cured layer, and the inorganic oxide film are laminated in this order.

Item 27. The laminating sheet for use in organic glass according to Item 26, further having a colored layer that has been partially formed between the resin film layer and the primer layer and/or between the primer layer and the cured layer and/or between the cured layer and the inorganic oxide film.

Item 28. Use of a laminating sheet for use in organic glass for producing an organic glass laminate according to any one of Items 1 to 12, wherein, in the laminating sheet for use in organic glass,
at least a cured layer and an inorganic oxide film are laminated on a base material film,
the cured layer is formed of a cured product of a resin composition containing a curable resin and an ultraviolet absorbent,
the cured product has a glass transition point of 80-160° C., and
the inorganic oxide film has a thickness of 0.01 µm or more and less than 0.5 µm.

Item 29. A method of producing an organic glass laminate, comprising:
a step 1 of laminating at least a cured layer onto an organic glass base substrate by using a laminating sheet for use in organic glass according to any one of Items 13 to 19; and
a step 2 of forming an inorganic oxide film having a thickness of 0.01 µm or more and less than 0.5 µm on the cured layer that has been laminated on the organic glass base substrate.

Item 30. The method of producing an organic glass laminate according to Item 29, wherein, in the step 1, the cured layer is laminated onto the organic glass base substrate by press-bonding the laminating sheet for use in organic glass according to any one of Items 13 to 19 onto the organic glass base substrate that has been molded in advance.

Item 31. The method of producing an organic glass laminate according to Item 30, wherein the organic glass base substrate on which the cured layer has been laminated is subjected to a bending process between the step 1 and the step 2.

Item 32. The method of producing an organic glass laminate according to Item 29, wherein, in the step 1, the cured layer is laminated onto the organic glass base substrate by injecting an organic glass resin onto the laminating sheet for use in organic glass according to any one of Items 13 to 19.

Item 33. A method of producing an organic glass laminate, comprising a step of laminating at least a cured layer and an inorganic oxide film in this order onto an organic glass base substrate by using a laminating sheet for use in organic glass according to any one of Items 21 to 27.

Item 34. The method of producing an organic glass laminate according to Item 33, wherein at least the cured layer and the inorganic oxide film are laminated in this order onto the organic glass base substrate by press-bonding the laminating sheet for use in organic glass according to any one of Items 21 to 27 onto the organic glass base substrate that has been molded in advance.

Item 35. The method of producing an organic glass laminate according to Item 33, wherein at least the cured layer and the inorganic oxide film are laminated in this order onto the organic glass base substrate by injecting an organic glass resin onto the laminating sheet for use in organic glass according to any one of Items 21 to 27.

Advantages of the Invention

In the organic glass laminate of the present invention, the weather resistance is significantly improved because an inorganic oxide film is laminated via a cured layer having predetermined composition and glass transition point, so that generation of cracks or delamination in the inorganic oxide film can be suppressed. Further, by laminating the inorganic oxide film via the cured layer having predetermined composition and glass transition point, the organic glass laminate of the present invention can be provided with an excellent abrasion resistance even when the thickness of the inorganic oxide film is less than 0.5 µm, so that the period of time needed for forming the inorganic oxide film can be shortened, thereby contributing to improvement in the production efficiency. Furthermore, the organic glass laminate of the present invention is provided with a moldability that can follow a bending process, so that, even when the organic glass laminate is subjected to a bending process, generation of cracks or delamination in the inorganic oxide film can be suppressed, thereby providing an excellent processability.

Also, according to one mode of a laminating sheet for use in organic glass of the present invention, the cured layer can be laminated onto the organic glass base substrate by a convenient method. Therefore, the organic glass laminate of the present invention can be produced in a convenient manner by laminating the cured layer onto the organic glass base substrate with use of the laminating sheet for use in organic glass of the present invention and thereafter forming an inorganic oxide film on the cured layer. Further, the cured layer has a moldability that can follow a bending process because of having a predetermined glass transition point. Therefore, a bent organic glass laminate can be produced without generation of cracks by laminating the cured layer onto the organic glass base substrate with use of the laminating sheet for use in organic glass of the present invention, performing a bending process, and thereafter forming an inorganic oxide film on the cured layer.

Furthermore, according to another mode of a laminating sheet for use in organic glass of the present invention, the cured layer and the inorganic oxide film can be simultaneously laminated onto the organic glass base substrate, so that the organic glass laminate of the present invention can be produced conveniently and efficiently.

EMBODIMENTS OF THE INVENTION

In the present specification, the representation of "X-Y" regarding a numerical value range refers to a range of X or more and Y or less. For example, the representation of "80-160° C." refers to a range of 80° C. or more and 160° C. or less.

1. Organic Glass Laminate

The organic glass laminate of the present invention is an organic glass laminate used as an exterior member, the organic glass laminate having at least an organic glass base substrate, a cured layer, and an inorganic oxide film in this order, the cured layer being formed of a cured product of a resin composition containing a curable resin and an ultraviolet absorbent, wherein the cured product has a glass transition point of 80-160° C., and the inorganic oxide film has a thickness of 0.01 μm or more and less than 0.5 μm. Hereafter, the organic glass laminate of the present invention will be described in detail.

Lamination Structure

Figure 1:
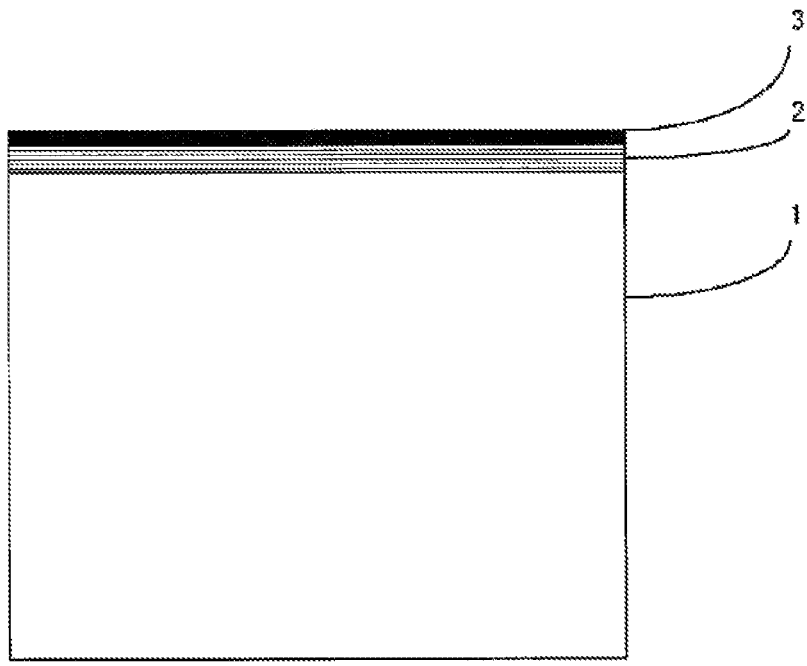
FIG. 1 is a view showing a cross-sectional structure of an organic glass laminate of the present invention.

Referring to FIG. 1, the organic glass laminate of the present invention is provided with a lamination structure having at least an organic glass base substrate 1, a cured layer 2, and an inorganic oxide film 3 in this order.

Further, in the organic glass laminate of the present invention, a primer layer 4 may be provided between the organic glass base substrate 1 and the cured layer 2 for the purpose of improving adhesion to the organic glass base substrate 1.

Furthermore, in the organic glass laminate of the present invention, an adhesive layer 5 may be provided between the organic glass base substrate 1 and the cured layer 2 in accordance with the needs for the purpose of improving adhesion to the organic glass base substrate 1. When the aforementioned primer layer 4 is provided, the adhesive layer 5 is preferably disposed between the organic glass base substrate 1 and the primer layer 4.

Further, in the organic glass laminate of the present invention, a resin film layer 6 may be provided between the organic glass base substrate 1 and the cured layer 2 in accordance with the needs for the purpose of supporting the cured layer 2 and improving adhesion to the organic glass base substrate. When the aforementioned primer layer 4 is provided, the resin film layer 6 is preferably disposed between the organic glass base substrate 1 and the primer layer 4. Also, when the aforementioned adhesive layer 5 is provided, the resin film layer 6 is preferably disposed between the organic glass base substrate 1 and the adhesive layer 5.

Figure 2:
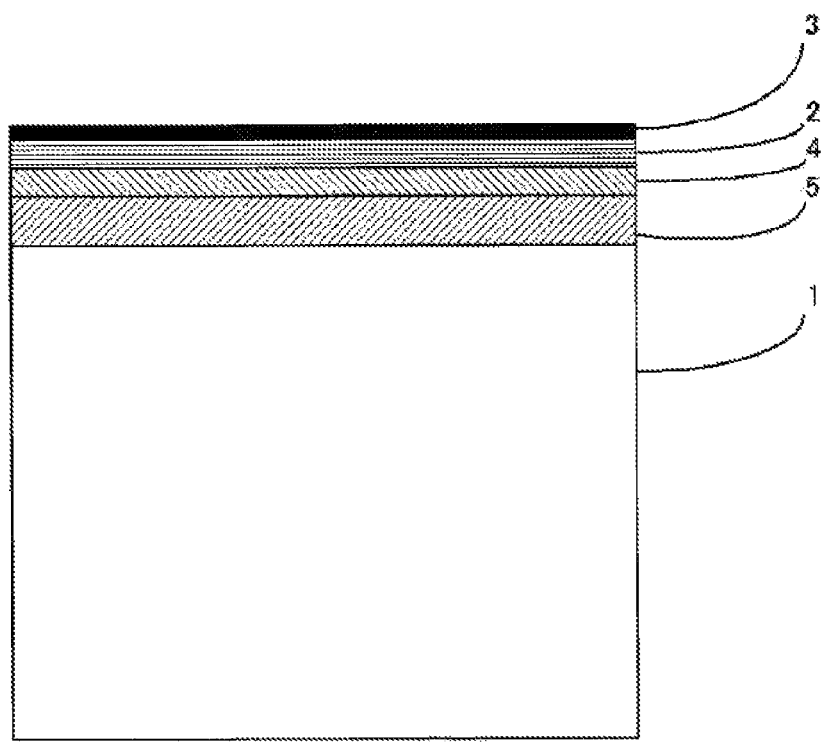
FIG. 2 is a view showing a cross-sectional structure of an organic glass laminate of the present invention.
Figure 3:
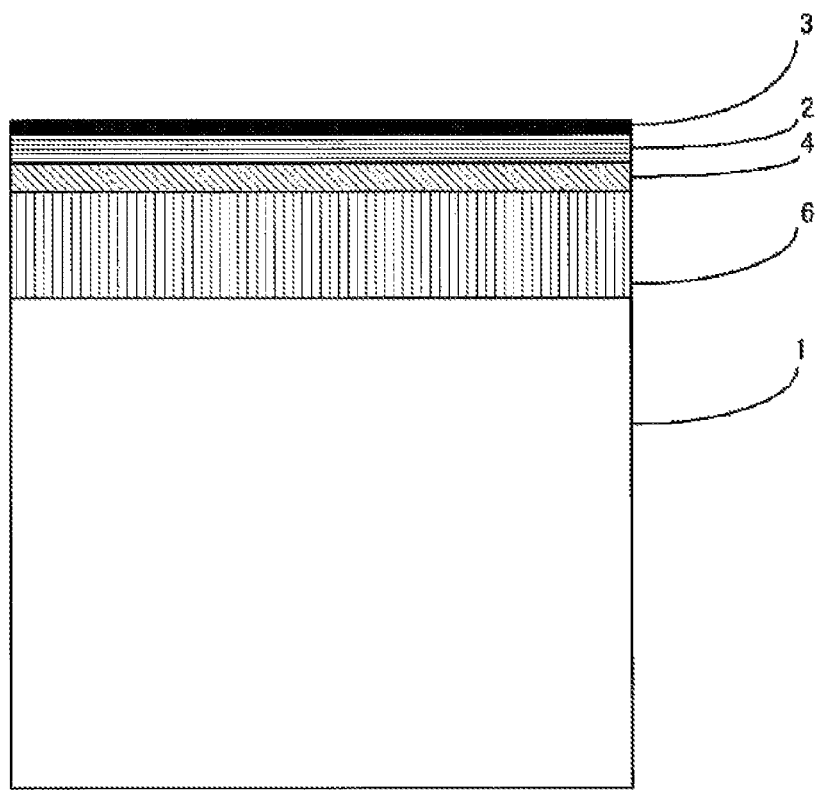
FIG. 3 is a view showing a cross-sectional structure of an organic glass laminate of the present invention.

With regard to the organic glass laminate of the present invention, FIG. 2 shows a lamination structure in the case in which the primer layer 4 and the adhesive layer 5 are provided, and FIG. 3 shows a lamination structure in the case in which the primer layer 4 and the resin film layer 6 are provided.

Figure 4:
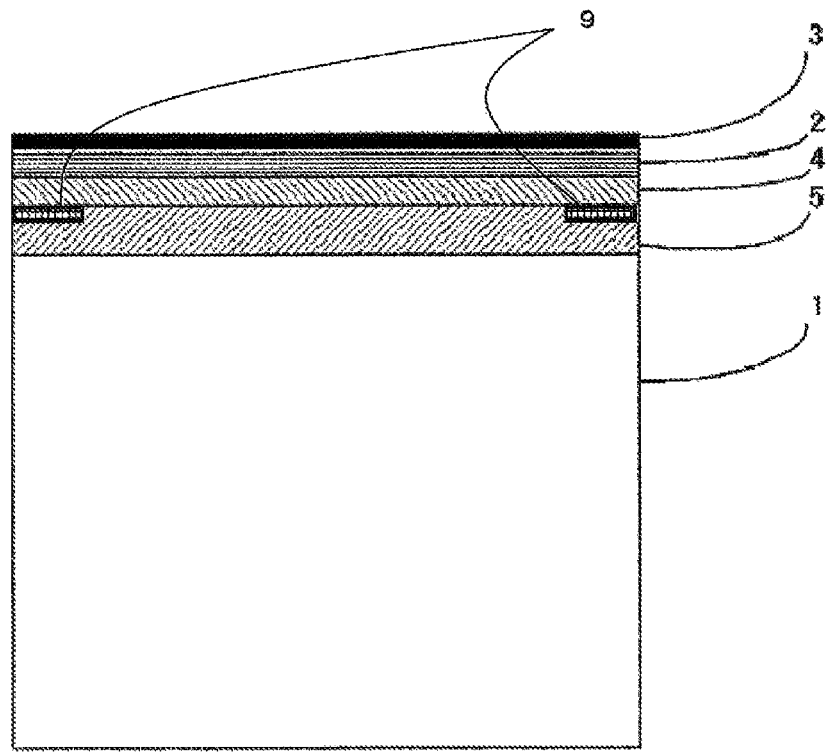
FIG. 4 is a view showing a cross-sectional structure of an organic glass laminate of the present invention.

In the organic glass laminate of the present invention, a colored layer 9 that has been partially formed may be provided between the organic glass base substrate 1 and the inorganic oxide film 3 for the purpose of concealing an adhesive application part in fixing the organic glass laminate of the present invention, displaying information, imparting a design property, or the like. For example, when the primer layer 4 and the adhesive layer 5 are provided in the organic glass laminate of the present invention, the colored layer 9 may be provided between the inorganic oxide film 3 and the cured layer 2 and/or between the cured layer 2 and the primer layer 4 and/or between the primer layer 4 and the adhesive layer 5 and/or between the adhesive layer 5 and the organic glass base substrate 1. FIG. 4 is a cross-sectional model view showing a mode having a colored layer 9 that has been partially formed between the primer layer 4 and the adhesive layer 5 in the organic glass laminate of the present invention. Also, for example, when the resin film layer 6 and the primer layer 7 are provided in the organic glass laminate of the present invention, the colored layer 9 may be provided between the resin film layer 6 and the primer layer 7 and/or between the primer layer 7 and the cured layer 2.

Also, in the organic glass laminate of the present invention, it is possible to adopt a construction in which the cured layer 2 and the inorganic oxide film 3 are disposed only on one surface of the organic glass base substrate 1; however, the cured layer 2 and the inorganic oxide film 3 may be disposed on both surfaces of the organic glass base substrate 1. In other words, in the latter case, the organic glass laminate of the present invention is provided with a lamination structure having at least the inorganic oxide film 3, the cured layer 2, the organic glass base substrate 1, the cured layer 2, and the inorganic oxide film 3 in this order.

Composition and the Like of Each Layer Constituting the Organic Glass Laminate

Hereafter, the composition, the physical properties, the thickness, and the like of each layer constituting the organic glass laminate of the present invention will be described.

[Organic Glass Base Substrate 1]

In the organic glass laminate of the present invention, the kind of the organic glass used in the organic glass base substrate 1 is not particularly limited as long as the organic glass is transparent, has strength, and can be used as a substitute for a current glass. Examples of the organic glass include polycarbonate, polymethyl methacrylate, polyacrylate, polyethylene terephthalate, polyethylene naphthalate, polyolefin, and ABS. Among these kinds of organic glass, polycarbonate is suitably used because polycarbonate is excellent in shock resistance, transparency, and heat resistance.

In the case in which polycarbonate is used as the organic glass base substrate 1, the melt volume rate (MVR) thereof is not particularly limited; however, the melt volume rate may be about 6-25 $cm^3$/10 minutes, preferably about 6-12 $cm^3$/10 minutes. The lower the melt volume rate is, the more excellent shock resistance is exhibited. Therefore, a polycarbonate resin provided with a suitable melt volume rate may be selected in accordance with the purpose of use of the organic glass laminate of the present invention. Here, the melt volume rate is a value as determined under the conditions with a temperature of 300° C. and a load of 1.2 kgf according to JIS K 7210-1999.

Also, in the organic glass laminate of the present invention, the organic glass base substrate 1 may be formed by lamination of a plurality of organic glass layers of the same kind or of different kinds. As one mode of the organic glass base substrate 1 in which a plurality of organic glass layers are laminated, a structure in which a polycarbonate base substrate and a base substrate made of a different organic glass are laminated can be mentioned. For example, by using an organic glass base substrate 1 in which a polycarbonate base substrate and a polymethyl methacrylate base substrate are laminated sequentially from the cured layer 2 side or an organic glass base substrate 1 in which a polymethyl methacrylate base substrate, a polycarbonate base substrate, and a polymethyl methacrylate base substrate are laminated sequentially from the cured layer 2 side, the organic glass base substrate 1 can have both the shock resistance brought about by the polycarbonate base substrate and the high hardness brought about by the polymethyl methacrylate base substrate.

Also, when the organic glass base substrate 1 assumes a lamination structure of a plurality of layers, two or more polycarbonate base substrates having different compositions such as physical properties, chemical compositions, and amounts of additives may be laminated. For example, by using an organic glass base substrate 1 in which a hard polycarbonate base substrate having a high molecular weight and a soft polycarbonate base substrate having a low molecular weight are laminated sequentially from the cured layer 2 side, the organic glass base substrate 1 can be made to have a higher weather resistance in addition to the shock resistance brought about by the polycarbonate base substrate. Alternatively, in the case of an organic glass base substrate 1 having a three-layer structure made of a first polycarbonate base substrate, a second polycarbonate base substrate, and a third polycarbonate base substrate from the cured layer 2 side, the function of the second base substrate as a core material is enhanced by setting the amount of the ultraviolet absorbent contained in the first polycarbonate base substrate and the second polycarbonate base substrate to be higher than the amount of the ultraviolet absorbent contained in the second polycarbonate base substrate, whereby an excellent shock resistance is ensured by the second substrate, and also the organic glass base substrate 1 can be made to have a higher weather resistance in combination.

In this manner, the organic glass base substrate 1 formed by lamination of a plurality of organic glass layers of the same kind or of different kinds can be prepared, for example, by coextrusion.

The shape of the organic glass base substrate 1 is not particularly limited and may be suitably set in accordance with the purpose of use of the organic glass laminate that is to be produced; however, the thickness of the organic glass base substrate 1 may be typically 0.5-50 mm, preferably 0.8-20 mm, and more preferably 1.0-5 mm.

[Cured Layer 2]

In the organic glass laminate of the present invention, the cured layer 2 is layer disposed between the organic glass base substrate 1 and the inorganic oxide film 3 in a manner of being in surface contact with the inorganic oxide film. The cured layer 2 is formed of a cured product of a resin composition containing a curable resin and an ultraviolet absorbent, wherein the cured product has a glass transition point of 80-160° C. The organic glass laminate can be provided with excellent weather resistance and abrasion resistance by combining and laminating the cured layer 2 having specific glass transition point and composition such as this and the inorganic oxide film 3 described later. Further, because of satisfying a specific glass transition point, the cured layer 2 can be provided with a moldability that can follow a bending process, so that, in producing the organic glass laminate of the present invention, a bending process can be carried out in a state in which the cured layer 2 has been laminated on the organic glass base substrate 1 before the inorganic oxide film 3 is formed. Thus, the characteristics of the cured layer 2 contribute also in conveniently producing a bent organic glass laminate of the present invention.

(Glass Transition Point)

It is sufficient that the glass transition point of the cured product constituting the cured layer 2 satisfies a range of 80-160° C. When the glass transition point of the cured product constituting the cured layer 2 is lower than 80° C., the heat resistance of the cured layer 2 becomes insufficient, and a tendency will appear such that, by the heat that is added in the process of laminating the inorganic oxide film 3, the cured layer 2 undergoes whitening, yellowing, film thickness reduction, or the like, thereby aggravating the transparency and decreasing the weather resistance. Meanwhile, when the glass transition point of the cured product constituting the cured layer 2 exceeds 160° C., the weather resistance, abrasion resistance, and property of following at the time of the bending process tend to decrease. From the viewpoint of providing further more excellent weather resistance, abrasion resistance, and property of following the bending process, the glass transition point of the cured product constituting the cured layer 2 is preferably 90-150° C., for example.

In the present specification, the glass transition point of the cured product constituting the cured layer 2 is a value as measured by the dynamic viscoelasticity measurement method (DMA; Dynamic Mechanical Analysis). Specifically, with respect to the cured product constituting the cured layer 2, the storage modulus of elasticity and the loss modulus of elasticity are measured within a range of 0-200°

C. in a dynamic viscoelasticity measurement apparatus with an observation length of 15 mm, a temperature-raising speed of 5° C./minute, and a measurement frequency of 1 Hz; the peak top of tan δ, which is a value obtained by dividing the loss modulus of elasticity by the storage modulus of elasticity, is determined; and the temperature of the peak top is specified as the glass transition point.

In order to allow the cured product constituting the cured layer 2 to satisfy the glass transition point, it is sufficient that the kinds, combination, and the like of the curable resin used for forming the cured layer 2 are suitably set.

(Curable Resin)

The curable resin that is used for forming the cured layer 2 is not particularly limited as long as the curable resin is a resin that is cured by cross-linking and allows the aforementioned glass transition point to be satisfied, and examples of the curable resin include an ionizing-radiation-curable resin, a thermosetting resin, a room-temperature curable resin, a one-liquid reaction type curable resin, and a two-liquid reaction type curable resin. Among these curable resins, a preferable curable resin is an ionizing-radiation-curable resin in view of allowing the cured product to satisfy the aforementioned glass transition point and to be further more effectively provided with excellent weather resistance, abrasion resistance, and property of following the bending process.

The ionizing-radiation-curable resin may be specifically, for example, a suitable mixture of a prepolymer, an oligomer, and/or a monomer, which contains functional groups (polymerizable unsaturated bonds and/or epoxy groups) in a molecule. Here, the ionizing radiation refers to one having an energy quantum that can polymerize or cross-link molecules among the electromagnetic waves or charged particle beams. Typically, ultraviolet ray or an electron beam is used as the ionizing radiation. However, the ionizing radiation is preferably an electron beam in order to avoid a situation in which curing of the cured layer 2 becomes insufficient due to action of the ultraviolet absorbent contained in the cured layer 2.

The kind of the ionizing-radiation-curable resin used in the cured layer 2 may be suitably set so as to satisfy the aforementioned glass transition point, so that the kind is not particularly limited as long as the glass transition point can be satisfied. A suitable example of the ionizing-radiation-curable resin may be a polyfunctional (meth)acrylate having two or more polymerizable unsaturated bonds (two or more functions) in a molecule. Here, in the present invention, the (meth)acrylate means an acrylate or a methacrylate, and other similar notations have the same meaning.

The number of functional groups in the polyfunctional (meth)acrylate is not particularly limited as long as the aforementioned glass transition point can be satisfied; however, the number may be, for example, 2-50, preferably 2-8, and more preferably 2-6.

Specific examples of the polyfunctional (meth)acrylate include urethane (meth)acrylate, caprolactone-modified urethane (meth)acrylate, (meth)acrylate having an alicyclic ring or an aliphatic heterocyclic ring, polycarbonate (meth)acrylate, pentaerythritol-based (meth)acrylate, epoxy (meth)acrylate, polyester (meth)acrylate, polyether (meth)acrylate, polybutadiene (meth)acrylate, silicone (meth)acrylate, and aminoplast resin (meth)acrylate.

Here, the urethane (meth)acrylate can be obtained, for example, by esterifying, with (meth)acrylic acid, a polyurethane oligomer obtained by reaction of a polyol such as polyether polyol, polyester polyol, or polycarbonate polyol with polyisocyanate. The caprolactone-modified urethane (meth)acrylate can be obtained, for example, by reaction of caprolactone-modified polyol, polyisocyanate, and hydroxy (meth)acrylate. The polycarbonate (meth)acrylate can be obtained, for example, by esterifying, with (meth)acrylic acid, a part or a whole of the hydroxyl groups of polycarbonate polyol. The pentaerythritol-based (meth)acrylate can be obtained, for example, by esterifying, with (meth)acrylic acid, a part or a whole of the hydroxyl groups of pentaerythritol or a polymerized product thereof. The epoxy (meth)acrylate can be obtained, for example, by esterification allowing (meth)acrylic acid to react with an oxirane ring of a bisphenol-type epoxy resin or a novolak-type epoxy resin having a comparative low molecular weight. Also, a carboxyl-modified type epoxy (meth)acrylate obtained by partially modifying this epoxy (meth)acrylate with dibasic carboxylic anhydride can be used as well. The polyester (meth)acrylate can be obtained, for example, by esterifying, with (meth)acrylic acid, a hydroxyl group of a polyester oligomer having the hydroxyl group at two terminal ends that is obtained by condensation of polyvalent carboxylic acid and polyhydric alcohol, or by esterifying, with (meth)acrylic acid, a hydroxyl group at a terminal end of an oligomer obtained by adding alkylene oxide to polyvalent carboxylic acid. The polyether (meth)acrylate can be obtained, for example, by esterifying, with (meth)acrylic acid, a hydroxyl group of polyether polyol. The polybutadiene (meth)acrylate can be obtained, for example, by adding (meth)acrylate acid to the side chain of a polybutadiene oligomer. The silicone (meth)acrylate can be obtained, for example, by modifying, with (meth)acrylic acid, a silicone having a polysiloxane bond in the main chain. The aminoplast resin (meth)acrylate can be obtained, for example, by modifying, with (meth)acrylic acid, an aminoplast resin having a lot of reactive groups in a small molecule.

These polyfunctional (meth)acrylates may be used either alone as one kind or as a combination of two or more kinds.

Among these polyfunctional (meth)acrylates, a preferable example thereof may be a combination of (i) a tri- or more functional (meth)acrylate and (ii) a bifunctional (meth)acrylate in view of allowing the aforementioned glass transition point to be satisfied and allowing the organic glass laminate to be further more effectively provided with excellent weather resistance, abrasion resistance, and property of following the bending process. Hereafter, the combination of (i) a tri- or more functional (meth)acrylate and a bifunctional (meth)acrylate will be described.

<(i) Tri- or More Functional (meth)acrylate>

Examples of the tri- or more functional (meth)acrylate include urethane (meth)acrylate, caprolactone-modified urethane (meth)acrylate, polycarbonate (meth)acrylate, pentaerythritol-based (meth)acrylate, epoxy (meth)acrylate, polyester (meth)acrylate, polyether (meth)acrylate, polybutadiene (meth)acrylate, silicone (meth)acrylate, and aminoplast resin (meth)acrylate. These tri- or more functional (meth)acrylates may be used either alone as one kind or as a combination of two or more kinds.

The number of functional groups in the tri- or more functional (meth)acrylate is not particularly limited as long as the number of functional groups is 3 or more; however, the number of functional groups may be, for example, 3-50, preferably 3-8, and more preferably 4-6, from the viewpoint of allowing the aforementioned glass transition point to be satisfied and allowing the organic glass laminate to be further more effectively provided with excellent weather resistance, abrasion resistance, and property of following the bending process.

The average molecular weight of the tri- or more functional (meth)acrylate may differ depending on the kind thereof and cannot be uniformly defined; however, the average molecular weight may be, for example, 200-100000, preferably 500-50000, and more preferably 1000-30000. Here, the average molecular weight of a tri- or more functional (meth)acrylate refers to a weight-average molecular weight as determined by GPC analysis and converted in terms of standard polystyrene.

Among these tri- or more functional (meth)acrylates, a preferable example thereof may be a urethane (meth)acrylate, more preferably a urethane (meth)acrylate having a backbone of polyether, polyester, polycarbonate, or the like, from the viewpoint of allowing the aforementioned glass transition point to be satisfied and allowing the organic glass laminate to be further more effectively provided with excellent weather resistance and abrasion resistance.

These tri- or more functional (meth)acrylates may be used either alone as one kind or as a combination of two or more kinds.

<(ii) Bifunctional (meth)acrylate>

As the kind of the bifunctional (meth)acrylate, a bifunctional one may be suitably selected from among the (meth)acrylates described above.

The ratio of the (i) tri- or more functional (meth)acrylate and the (ii) bifunctional (meth)acrylate may be suitably set in accordance with the kind and the like of each (meth)acrylate to be combined, and the ratio may be, for example, such that the (ii) bifunctional (meth)acrylate is contained at 1-150 parts by mass, preferably 5-120 parts by mass, more preferably 10-100 parts by mass, relative to 100 parts by mass of the (i) tri- or more functional (meth)acrylate.

A preferable example of the bifunctional (meth)acrylate may be (ii-1) a caprolactone-modified urethane acrylate, (ii-2) a (meth)acrylate in which two (meth)acryloyl groups are bonded to one alicyclic ring or aliphatic heterocyclic ring directly or via a linker region having a molecular weight of 200 or less, and/or (ii-3) a bifunctional urethane (meth)acrylate in which two (meth)acryloyl groups are bonded to an aliphatic chain via a urethane bond, from the viewpoint of providing a further more excellent weather resistance, abrasion resistance, and property of following a bending process. Hereafter, these bifunctional (meth)acrylates will be described.

<<(ii-1) Caprolactone-Modified Urethane Acrylate>>

The bifunctional caprolactone-modified urethane (meth)acrylate (which may hereafter be referred to as "(ii-1) bifunctional (meth)acrylate") can be obtained, for example, by reaction of caprolactone-modified diol, polyisocyanate, and hydroxy(meth)acrylate.

A preferable caprolactone-modified diol is one having two hydroxyl groups and having a weight-average molecular weight of 500-3000, more preferably 750-2000. Further, one kind or two or more kinds of diols other than caprolactone-modified diol, for example, ethylene glycol, diethylene glycol, 1,4-butanediol, or 1,6-hexanediol, may be mixed at an arbitrary ratio as a constituent source material for use.

A preferable polyisocyanate is a diisocyanate having two isocyanate groups, and preferable examples thereof include isophorone diisocyanate, hexamethylene diisocyanate, 4,4'-dicyclohexylmethane diisocyanate, and trimethylhexamethylene diisocyanate, from the viewpoint of suppressing yellowing. Further, preferable examples of the hydroxy(meth)acrylate include 2-hydroxyethyl (meth)acrylate, 2-hydroxypropyl (meth)acrylate, and caprolactone-modified-2-hydroxyethyl (meth)acrylate.

The bifunctional caprolactone-modified urethane (meth)acrylate can be synthesized by reaction of polycaprolactone-based diol such as these, polyisocyanate, and hydroxy(meth)acrylate. A preferable synthesis method is a method comprising producing a polyurethane prepolymer having an —NCO group (isocyanate group) at both terminal ends by allowing polycaprolactone-modified diol to react with polyisocyanate and thereafter allowing the polyurethane prepolymer to react with hydroxy(meth)acrylate. The conditions and the like of the reaction may be in accordance with a conventional method.

The average molecular weight of the bifunctional caprolactone-modified urethane (meth)acrylate may be, for example, 1000-12000, preferably 1000-10000. Here, the average molecular weight of a bifunctional (meth)acrylate refers to a weight-average molecular weight as determined by GPC analysis and converted in terms of standard polystyrene.

The ratio of the (i) tri- or more functional (meth)acrylate and the (ii-1) bifunctional caprolactone-modified (meth)acrylate is not particularly limited; however, it is preferable to use the (i) tri- or more functional (meth)acrylate as a main agent, and the ratio may be, for example, such that the (ii-1) bifunctional (meth)acrylate is contained at 1-120 parts by mass, preferably 5-100 parts by mass, and more preferably 10-80 parts by mass, relative to 100 parts by mass of the (i) tri- or more functional (meth)acrylate.

<<(ii-2) A (meth)acrylate in which Two (meth)acryloyl Groups are Bonded to One Alicyclic Ring or Aliphatic Heterocyclic Ring Directly or Via a Linker Region Having a Molecular Weight of 200 or Less>>

The (meth)acrylate in which two (meth)acryloyl groups are bonded to one alicyclic ring or aliphatic heterocyclic ring directly or via a linker region having a molecular weight of 200 or less (which may hereafter be referred to also as "(ii-2) bifunctional (meth)acrylate") is not particularly limited as long as the (ii-2) bifunctional (meth)acrylate has a structure having one alicyclic ring or heterocyclic ring in one molecule and having two (meth)acryloyl groups (—C(=O)—CH=CH$_2$ or —C(=O)—C(CH$_3$)=CH$_2$) that are bonded to the alicyclic ring or heterocyclic ring directly or via a linker region having a molecular weight of 200 or less.

The alicyclic ring or heterocyclic ring that the (ii-2) bifunctional (meth)acrylate has may have either a monocyclic ring structure or a condensed ring structure. Also, the number of ring members in the alicyclic ring or heterocyclic ring (number of ring members in the case of a monocyclic ring structure) is not particularly limited; however, the number may be, for example, 5-10, preferably 5-8, and more preferably 5-6. Also, the alicyclic ring or heterocyclic ring may be a condensed ring obtained by condensation of, for example, two to four, preferably two to three, alicyclic rings or heterocyclic rings (monocyclic rings) having the number of ring members.

A preferable example of the (ii-2) bifunctional (meth)acrylate may be one having an alicyclic ring.

Specific examples of the alicyclic ring or heterocyclic ring include dicyclopentane, tricyclodecane, cyclohexane, triazine, cyclopentane, and isocyanurate. Among these, preferable examples include dicyclopentane and tricyclodecane.

Also, the alicyclic ring or heterocyclic ring may have a substituent in addition to the (meth)acryloyl groups that are bonded directly or via a linker region having a molecular weight of 200 or less. The kind of the substituent is not particularly limited; however, the substituent may be, for example, an alkyl group having a carbon number of 1-5, an alkoxyl group having a carbon number of 1-5, a hydroxyalkyl group having a carbon number of 1-5, a hydroxyl group, a halogen atom, or the like. Also, the number of the substituents may differ depending on the structure of the alicyclic ring or heterocyclic ring or the like, and cannot be uniformly defined; however, the number may be, for example, 0-14, preferably 0-10, and more preferably 0-6.

In the (ii-2) bifunctional (meth)acrylate, the (meth)acryloyl groups may be linked to the alicyclic ring or heterocyclic ring directly, or the (meth)acryloyl groups may be bonded to the alicyclic ring or heterocyclic ring via a linker. In the case in which the (meth)acryloyl groups are bonded to the alicyclic ring or heterocyclic ring via a linker, it is sufficient that the molecular weight of the linker moiety is 200 or less, preferably 14-200, more preferably 14-150, and still more preferably 14-120. Also, the structure of the linker is not particularly limited as long as the molecular weight range is satisfied; however, the linker may be, for example, an alkylene group having a carbon number of 1-8; a bond such as urethane bond, ester bond, ether bond, thioether bond, or amide bond: or a linker in which the bond is contained in an alkylene group having a carbon number of 1-4, or the like.

Specific examples of the linker include groups represented by the following general formulas (A) to (J).

[Chemical formula 1]

—(CH$_2$)$_{n1}$—O—                                                       (A)

—(CH$_2$)$_{n2}$—NHC(=O)O—(CH$_2$)$_{n3}$—O—    (B)

—(CH$_2$)$_{n4}$—OC(=O)NH—(CH$_2$)$_{n5}$—O—    (C)

—(CH$_2$)$_{n2}$—C(=O)O—(CH$_2$)$_{n3}$—O—      (D)

—(CH$_2$)$_{n4}$—OC(=O)—(CH$_2$)$_{n5}$—O—      (E)

—(CH$_2$)$_{n4}$—NHC(=O)—(CH$_2$)$_{n5}$—O—    (F)

—(CH$_2$)$_{n4}$—C(=O)NH—(CH$_2$)$_{n5}$—O—    (G)

—(CH$_2$)$_{n6}$—O—(CH$_2$)$_{n7}$—O—            (H)

—(CH$_2$)$_{n6}$—S—(CH$_2$)$_{n7}$—O—            (I)

—O—                                                                        (J)

With regard to each of the groups represented by the general formulas (A) to (J), the left end thereof is bonded to the alicyclic ring or heterocyclic ring, and the right end thereof is bonded to the (meth)acryloyl group.

In the general formula (A), n$_1$ represents an integer of 1-8, preferably 1-6, more preferably 1-4.

In the general formulas (B) and (D), n2 represents an integer of 0-6, preferably 0-4, more preferably 0-2. Also, in the general formulas (B) and (D), n3 represents an integer of 1-6, preferably 1-4, more preferably 1-2. Here, a sum of n2 and n3 is 12 or less, preferably 6 or less, more preferably 4 or less.

In the general formulas (C), (E), (F) and (G), n4 represents an integer of 0-6, preferably 0-4, more preferably 0-2. Also, in the general formulas (C), (E), (F) and (G), n5 represents an integer of 0-6, preferably 0-4, more preferably 0-2. Here, a sum of n4 and n5 is 12 or less, preferably 6 or less, more preferably 4 or less.

In the general formulas (H) and (I), n6 represents an integer of 0-6, preferably 0-4, more preferably 0-2. Also, in the general formulas (H) and (I), n7 represents an integer of 1-6, preferably 1-4, more preferably 1-2. Here, a sum of n6 and n7 is 12 or less, preferably 6 or less, more preferably 4 or less.

A specific example of the (ii-2) bifunctional (meth)acrylate may be a compound represented by the following general formula (1).

[Chemical formula 2]

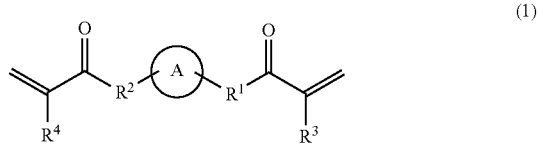

(1)

In the general formula (1), the ring A represents a compound having one to three substituted or unsubstituted alicyclic groups or heterocyclic groups. Specific examples of the alicyclic group or heterocyclic group are as described above. Also, in the general formula (1), R$^1$ and R$^2$ are the same as or different from each other, and each represent a single bond or a linker having a molecular weight of 200 or less. Specific examples of the linker are as described above. Also, in the general formula (1), R$^3$ and R$^4$ are the same as or different from each other, and each represent a hydrogen atom or a methyl group.

The molecular weight of the (ii-2) bifunctional (meth)acrylate is not particularly limited as long as the above-described structure is satisfied; however, the molecular weight may be, for example, 200-1200, preferably 200-800, more preferably 300-500.

Specific examples of the (ii-2) bifunctional (meth)acrylate include a (meth)acrylate obtained by urethane bond of two molecules of hydroxyalkyl (meth)acrylate (the carbon number of the hydroxyalkyl group being 1-4, preferably 1-2) to one molecule of isophorone diisocyanate, tricyclodecanedimethanol diacrylate, dicyclopentanyl di(meth)acrylate, caprolactone-modified dicyclopentenyl di(meth)acrylate, allylated cyclohexyl di(meth)acrylate, and isocyanurate di(meth)acrylate. Among these, preferable examples thereof include a (meth)acrylate obtained by urethane bond of two molecules of hydroxyalkyl (meth)acrylate to one molecule of isophorone diisocyanate, and tricyclodecanedimethanol diacrylate.

The (ii-2) bifunctional (meth)acrylate may be used either alone as one kind or as a combination of two or more kinds. Further, it is preferable that the (ii-2) bifunctional (meth)acrylate is used in combination with the (ii-1) bifunctional (meth)acrylate from the viewpoint of allowing the aforementioned glass transition point to be satisfied and allowing the organic glass laminate to be further more effectively provided with excellent weather resistance, abrasion resistance, and property of following the bending process.

The ratio of the (i) tri- or more functional (meth)acrylate and the (ii-2) bifunctional (meth)acrylate is not particularly limited; however, it is preferable to use the (i) tri- or more functional (meth)acrylate as a main agent, and the ratio may be, for example, such that the (ii-2) bifunctional (meth) acrylate is contained at 1-40 parts by mass, preferably 5-35 parts by mass, and more preferably 10-30 parts by mass, relative to 100 parts by mass of the (i) tri- or more functional (meth)acrylate.

Further, when the (ii-1) bifunctional (meth)acrylate and the (ii-2) bifunctional (meth)acrylate are used in combination as the bifunctional (meth)acrylate, the ratio of the (i) tri-or more functional (meth)acrylate and these bifunctional (meth)acrylates is not particularly limited; however, it is preferable to use the (i) tri- or more functional (meth) acrylate as a main agent, and the ratio may be, for example, such that the (ii-1) bifunctional (meth)acrylate is contained at 0.5-120 parts by mass, preferably 1.5-100 parts by mass, and more preferably 2.5-80 parts by mass, and the (ii-2) bifunctional (meth)acrylate is contained at 1-40 parts by mass, preferably 3-35 parts by mass, and more preferably 5-30 parts by mass, relative to 100 parts by mass of the (i) tri- or more functional (meth)acrylate.

<<(ii-3) Bifunctional Urethane (meth)acrylate in which Two (meth)acryloyl Groups are Bonded to an Aliphatic Chain Via a Urethane Bond>>

The bifunctional urethane (meth)acrylate in which two (meth)acryloyl groups are bonded to an aliphatic chain via a urethane bond (which may hereafter be referred to also as "(ii-3) bifunctional (meth)acrylate") is not particularly limited as long as the (ii-3) bifunctional (meth)acrylate has a structure in which two (meth)acryloyl groups (—C(=O)—CH=CH$_2$ or —C(=O)—C(CH$_3$)=CH$_2$) are bonded via an aliphatic chain having a urethane bond.

It is preferable that, in the (ii-3) bifunctional (meth) acrylate, the urethane bond is present not at the terminal end of the aliphatic chain but in the form of being incorporated in the aliphatic chain.

The total number of carbons constituting the aliphatic chain (the number of carbons other than the urethane bond moiety) is not particularly limited; however, the total number of carbons may be, for example, 2-90, preferably 2-70, more preferably 2-50.

In the (ii-3) bifunctional (meth)acrylate, the aliphatic chain may contain a bond other than the urethane bond. Examples of the bond other than the urethane bond include ester bond, amide bond, ether bond, carbonate bond, and thioether bond.

In the (ii-3) bifunctional (meth)acrylate, a specific example of the aliphatic chain containing the urethane bond may be a group represented by the following general formula (K).

[Chemical formula 3]

$$-(CH_2)_{n8}-OC(=O)NH-(CH_2)_{n9}-NHC(=O)O-(CH_2)_{n10}- \quad (K)$$

In the general formula (K), $n_8$ and $n_{10}$ are the same as or different from each other, and each represent an integer of 1-35, preferably 2-25, more preferably 2-8, and still more preferably 2-6. Also, in the general formula (K), n9 represents an integer of 1-35, preferably 2-25, more preferably 2-20, and still more preferably 2-8. Here, a sum of the values of $n_8$, $n_9$, and $n_{10}$ is 90 or less, preferably 3-70, more preferably 6-50, still more preferably 6-24, and most preferably 6-20.

A specific example of the (ii-3) bifunctional (meth)acrylate may be a compound represented by the following general formula (2).

[Chemical formula 4]

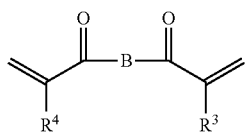

(2)

In the general formula (2), the group B represents the aliphatic chain having a urethane bond. Specific examples of the aliphatic chain are as described above. Also, in the general formula (2), $R^3$ and $R^4$ are the same as or different from each other, and each represent a hydrogen atom or a methyl group.

The molecular weight of the (ii-3) bifunctional (meth) acrylate is not particularly limited as long as the above-described structure is satisfied; however, the molecular weight may be, for example, 190-5000. In particular, the molecular weight of the (ii-3) bifunctional (meth)acrylate is preferably 190-1200, more preferably 190-600, from the viewpoint of allowing the organic glass laminate to be further more effectively provided with excellent weather resistance, abrasion resistance, and property of following the bending process.

The (ii-3) bifunctional (meth)acrylate may be used either alone as one kind or as a combination of two or more kinds.

The ratio of the (i) tri- or more functional (meth)acrylate and the (ii-3) bifunctional (meth)acrylate is not particularly limited; however, it is preferable to use the (i) tri- or more functional (meth)acrylate as a main agent, and the ratio may be, for example, such that the (ii-3) bifunctional (meth) acrylate is contained at 1-40 parts by mass, preferably 5-35 parts by mass, and more preferably 10-30 parts by mass, relative to 100 parts by mass of the (i) tri- or more functional (meth)acrylate.

(Ultraviolet Absorbent)

The cured layer 2 contains an ultraviolet absorbent together with the curable resin. Thus, the organic glass laminate can be provided with excellent weather resistance and abrasion resistance by allowing the glass transition point to be provided and incorporating the ultraviolet absorbent in the cured layer 2.

The kind of the ultraviolet absorbent used in the cured layer 2 is not particularly limited, and examples thereof include a hydroxyphenyltriazine-based compound, a benzotriazole-based compound, a benzophenone-based compound, an oxanilide-based compound, a phenyl salicylate-based compound, and an acrylonitrile-based compound. Among these, preferable examples thereof include a hydroxyphenyltriazine-based compound and a benzotriazole-based compound, and more preferable examples thereof include a hydroxyphenyltriazine-based compound. These ultraviolet absorbents may be used either alone as one kind or in combination of two or more kinds.

The ratio of the curable resin and the ultraviolet absorbent in the cured layer 2 is not particularly limited; however, the ultraviolet absorbent may be contained, for example, at 0.1-10 parts by mass, preferably at 0.2-10 parts by mass, relative to a total of 100 parts by mass of the curable resin, from the viewpoint of effectively protecting the curable resin of the cured layer 2, and is contained more preferably at 0.5-5 parts by mass, still more preferably at 0.7-2 parts by mass.

Further, the content of the ultraviolet absorbent in the cured layer 2 is not particularly limited; however, from the viewpoint of reducing the amount of ultraviolet rays that reach the layers below the cured layer 2, the ultraviolet absorbent may be contained, for example, at 0.1-20 parts by mass, preferably at 0.2-15 parts by mass, more preferably at 0.5-10 parts by mass, and still more preferably at 0.7-5 parts by mass, relative to a total of 100 parts by mass of the cured layer 2.

(Other Additives)

The cured layer 2 may contain, in addition to the above-described components, a light stabilizer in accordance with the needs in order to further improve the weather resistance. As a preferable light stabilizer, a hindered-amine-based light stabilizer (HALS) may be mentioned. Also, a suitable example of the light stabilizer may be a reactive hindered-amine-based light stabilizer having reactivity with a curable resin, that is, having a reactive group in a molecule. By using a reactive hindered-amine-based light stabilizer such as this, the hard-coating property (scratch resistance and the like) can be improved without generating inhibition of cross-linking, and also the bleed-out can be reduced, whereby decrease in the performance caused by the bleed-out, stickiness on the surface of the cured layer 2, and poor adhesion to the primer layer 4 that is provided in accordance with the needs can be effectively suppressed. A specific example of the reactive group may be a functional group having an ethylenic double bond, such as a (meth)acryloyl group, a vinyl group, or an allyl group. Preferable examples of the light stabilizer such as this include 1,2,2,6,6-pentamethyl-4-piperidinyl methacrylate (manufactured by BASF SE, trade name: "SANOL LS-3410") or (manufactured by Hitachi Chemical Company, Ltd., trade name: "FA-711MM") and 2,2,6,6-tetramethyl-4-piperidinyl methacrylate (manufactured by Hitachi Chemical Company, Ltd., trade name: "FA-712HM"). These light stabilizers may be used either alone as one kind or in combination of two or more kinds.

The content of the light stabilizer in the cured layer 2 is not particularly limited, and may be, for example, 0.5-10 parts by mass, preferably 1-8 parts by mass, and more preferably 2-6 parts by mass, relative to a total of 100 parts by mass of the ionizing-radiation-curable resin.

Furthermore, in accordance with the needs, the cured layer 2 may contain various kinds of additives other than those described above within a range that does not deteriorate the effect of the present invention. Examples of such additives include abrasion resistance improvers, polymerization inhibitors, crosslinking agents, infrared absorbents, antistatic agents, adhesiveness improvers, leveling agents, thixotropy imparting agents, coupling agents, lubricants, antifouling agents, plasticizers, antifoaming agents, filling agents, coloring agents, and filler particles.

For example, by adding filler particles having a higher hardness and heat resistance than the resin components, the hardness and heat resistance of the cured layer 2 can be improved, and also the damages to the cured layer 2 caused by exposure to heat or plasma in forming the inorganic oxide film 3 can be reduced. In particular, when the film-forming process of the inorganic oxide film 3 takes a long period of time or when the input electric power is high, it is preferable to add filler particles in order to suppress the damages to the cured layer 2, specifically the decomposition, whitening, or the like of the cured layer 2. The kind of the filler particles such as this is not particularly limited, and examples thereof include metal oxides such as silica, calcium oxide, magnesium oxide, zinc oxide, alumina, alumina hydrate, and titanium oxide; metal carbonates such as calcium carbonate, magnesium carbonate, and barium carbonate; metal sulfates such as calcium sulfate, barium sulfate, and magnesium sulfate; metal chlorides such as sodium chloride, magnesium chloride, silver chloride, and calcium chloride; metal silicates such as aluminum silicate and magnesium silicate; aluminosilicate, kaolin, talc, wollastonite, and mica. These filler particles may be used either alone as one kind or as a combination of two or more kinds. Among these kinds of filler particles, a preferable example is silica from the viewpoint of furthermore effectively reducing the damages to the cured layer 2. When the filler particles are added to the cured layer 2, the content thereof is preferably 20-70% by mass, more preferably 40-60% by mass, in the solid components of the cured layer 2.

(Thickness of Cured Layer 2)

The thickness of the cured layer 2 is not particularly limited; however, the thickness is typically 1-10 μm, preferably 1.5-6 μm, from the viewpoint of providing a furthermore excellent weather resistance, abrasion resistance, and property of following the bending process.

(Method of Forming Cured Layer 2)

The cured layer 2 may be formed by adopting a method that accords to the kind of the curable resin that is put to use. For example, in the case of using a thermosetting resin, a room-temperature curable resin, a one-liquid reaction type curable resin, or a two-liquid reaction type curable resin, the cured layer 2 may be formed by applying a resin composition for the cured layer 2, which is obtained by mixing these resins with an ultraviolet absorbent and various kinds of additives that are added in accordance with the needs, onto a predetermined placement site by a method such as gravure coating, bar coating, roll coating, reverse roll coating, or comma coating, and heating in accordance with the needs, so as to cure the resin composition.

The resin composition for the cured layer 2 may be one in which the curable resin and additives that are added in accordance with the needs are dissolved or dispersed in a solvent. The solvent that is used in the resin composition for the cured layer 2 may be a solvent that exhibits a solubility or compatibility with the curable resin and the additives that are added in accordance with the needs. The solvent may be suitably selected in accordance with the method of applying the resin composition for the cured layer 2, the method of drying at the time of forming the cured layer 2, or the like; however, an organic solvent is preferable from the viewpoint of solubility or compatibility with the curable resin, drying property, or the like. The organic solvent is not particularly limited, and examples thereof include alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used either alone as one kind or as a combination of two or more kinds.

Also, in the case of using an ionizing-radiation-curable resin, the cured layer may be formed by applying a resin composition for the cured layer, which is obtained by mixing the ionizing-radiation-curable resin with an ultraviolet absorbent and various kinds of additives that are added in accordance with the needs, onto a predetermined placement site by a method such as gravure coating, bar coating, roll coating, reverse roll coating, or comma coating, and radiating an ionizing radiation such as an electron beam or an ultraviolet ray onto the resin composition thereby to cure the resin composition.

In the case in which an electron beam is used for curing the ionizing-radiation-curable resin, an acceleration voltage thereof can be suitably set in accordance with the kind of the ionizing-radiation-curable resin that is put to use, the thickness of the cured layer 2, and the like; however, the acceleration voltage may be typically about 70-300 kV. Also, the dose of radiation is preferably such that the cross-linking density of the resin layer is saturated, and the dose of radiation is typically selected from within a range of 5-300 kGy (0.5-30 Mrad), preferably 10-100 kGy (1-10 Mrad). Further, an electron beam source is not particularly limited, so that various kinds of electron beam accelerators such as, for example, Cockcroft-Walton type, Van de Graaff type, resonance transformer type, insulated core transformer type, linear type, dynamitron type, and high-frequency type can be used.

Various kinds of additives can be added to the cured layer 2 thus formed, so as to perform a treatment of imparting functions such as a hard-coating function, an antifog coating function, an antiglare coating function, an antireflection coating function, an ultraviolet-shielding coating function, and an infrared-shielding coating function.

[Inorganic Oxide Film 3]

In the organic glass laminate of the present invention, the inorganic oxide film 3 is a layer placed on the cured layer 2 (the uppermost layer in the organic glass laminate). The inorganic oxide film 3 is set to have a thickness of 0.01 μm or more and less than 0.5 μm. The organic glass laminate can be provided with excellent weather resistance and abrasion resistance by combining and laminating the inorganic oxide film 3 having such a thickness and the cured layer 2.

It is sufficient that the inorganic oxide film 3 satisfies a thickness of 0.01 μm or more and less than 0.5 μm; however, the thickness is preferably 0.03-0.4 μm, more preferably 0.05-0.3 μm, from the viewpoint of providing a furthermore excellent weather resistance and abrasion resistance.

The inorganic oxide used for forming the inorganic oxide film 3 is not particularly limited, and examples thereof include silicon oxide, aluminum oxide, magnesium oxide, zinc oxide, tin oxide, titanium oxide, gallium oxide, indium oxide, chromium oxide, silicon oxynitride, aluminum oxynitride, magnesium oxynitride, zinc oxynitride, tin oxynitride, titanium oxynitride, and gallium oxynitride. Among these, preferable examples are silicon oxide and silicon oxynitride, and a more preferable example is silicon oxide, from the viewpoint of imparting a furthermore excellent weather resistance and abrasion resistance, costs, and facility in forming the film.

The method of forming the inorganic oxide film 3 is not particularly limited and may be any one of the methods such as the vapor deposition method, the ion plating method, and the sputtering method; however, from the viewpoint of facility in forming the inorganic oxide film 3, the vapor deposition method is preferable.

The vapor deposition method may be any one of the methods such as chemical vapor deposition (CVD) and physical vapor deposition (PVD); however, CVD is preferable. The CVD may be any one of plasma CVD, thermal CVD, and photo-CVD; however, the plasma CVD is preferable from the viewpoint of facility in forming the inorganic oxide film, controllability of the physical properties of the inorganic oxide film by adjustment of the gas flow rate, and the like.

The material used for forming the inorganic oxide film 3 may be suitably selected in accordance with the kind, the film-forming conditions, and the like of the inorganic oxide constituting the inorganic oxide film 3.

For example, in the case of forming a silicon oxide film by plasma CVD, the monomer material thereof is not particularly limited as long as the monomer has a suitable vapor pressure at an ordinary temperature and is such that the plasma CVD can be carried out. However, one example is an organic silicon compound having a methyl group and/or an ethyl group and having Si as a main chain. Specific examples of such organic silicon compounds include 1,1,3,3-tetramethyldisiloxane (TMDSO), hexamethyldisiloxane (HMDSO), vinyltrimethylsilane, methyltrimethylsilane (MTMOS), hexamethyldisilane, methylsilane, dimethylsilane, trimethylsilane, diethylsilane, propylsilane, phenylsilane, vinyltriethoxysilane, vinyltrimethoxysilane, tetramethoxysilane (TMOS), tetraethoxysilane (TEOS), phenyltrimethoxysilane, methyltriethoxysilane, and octamethylcyclotetrasiloxane. These organic silicon compounds may be used either alone as one kind or as a combination of two or more kinds. Among these organic silicon compounds, preferable examples are HMDSO, HMDSO, and TEOS from the viewpoint of adhesion of the inorganic oxide film 3 to the cured layer 2 and the like.

Further, in the case of forming the inorganic oxide film 3 by plasma CVD, it is sufficient that a gas composition for vapor deposition that is put to use contains a monomer material (monomer gas for vapor deposition), an oxygen-supplying gas, and a carrier gas. The oxygen-supplying gas used in the gas composition for vapor deposition may be, for example, oxygen gas, ozone gas, laughing gas ($N_2O$), or the like, and preferably is oxygen gas. Also, the carrier gas used in the gas composition for vapor deposition may be, for example, an inert gas such as argon gas or helium gas. Further, a nitride may be formed in the inorganic oxide film by incorporating nitrogen gas in the gas composition for vapor deposition.

Further, the ratio of mixing the gas components in the gas composition for vapor deposition may be suitably set in accordance with the kind of the monomer material that is put to use, the oxygen gas and water that remain in the film-forming chamber, the energy of plasma, and the like; however, the ratio may be, for example, such that the monomer material is contained at 1-40 vol %, the oxygen-supplying gas at 0-70 vol %, and the inert gas at 1-60 vol %.

Also, in the organic glass laminate, the inorganic oxide film 3 may be a single layer, or alternatively, two or more layers may be formed with the same inorganic oxide or with different inorganic oxides.

[Primer Layer 4]

In the organic glass laminate of the present invention, the primer layer 4 is a layer that is disposed between the organic glass base substrate 1 and the cured layer 2 in accordance with the needs in order to improve the adhesion to the organic glass base substrate 1. When the resin film layer 6 described later is disposed, the primer layer 4 may be disposed between the cured layer 2 and the resin film layer 6 and/or between the resin film layer 6 and the organic glass base substrate 1; however, it is preferable that the primer layer 4 is disposed at least between the cured layer 2 and the resin film layer 6.

The primer layer 4 is formed by using a binder resin. The binder resin is not particularly limited, and examples thereof include urethane resin, (meth)acryl resin, (meth)acryl/urethane copolymer resin, vinyl chloride/vinyl acetate copolymer resin, polyester resin, butyral resin, chlorinated polypropylene, and chlorinated polyethylene. These binder resins may be used either alone as one kind or as a combination of two or more kinds. Among these binder resins, urethane resin is preferably used, and polyurethane containing an acryl component is more preferably used.

The polyurethane containing an acryl component is a polyurethane having an acryl backbone in a polymer chain and may be specifically any one of a urethane acryl copolymer which is a copolymer of a urethane component and an acryl component, an acryl resin having a hydroxyl group or an isocyanate group as a polyol component or a polyisocyanate component constituting the polyurethane, and the like; however, a urethane acryl copolymer is preferably used. The urethane acryl copolymer can be obtained by a method of allowing a polyol compound and a polyisocyanate compound to react with an acryl resin having at least two hydroxyl groups in one molecule (see Japanese Patent Laid-open Publication No. 6-100653 and the like), a method of allowing an acryl monomer to react with a urethane prepolymer having an unsaturated double bond at both terminal ends (see Japanese Patent Laid-open Publication No. 10-1524 and the like), or the like.

Further, the polyurethane containing an acryl component is preferably a polyurethane having a polycarbonate backbone or a polyester backbone in addition to the acryl backbone in the polymer chain. The polyurethane having a polycarbonate backbone or a polyester backbone in the polymer chain may be a polyurethane obtained by using an acryl resin having a hydroxyl group or an isocyanate group and a polycarbonate resin or polyester resin having a hydroxyl group or an isocyanate group as a polyol component or a polyisocyanate component constituting the urethane resin; however, a polycarbonate-based urethane acryl copolymer which is a copolymer of a polycarbonate-based urethane component and an acryl component or a polyester-based urethane acryl copolymer which is a copolymer of a polyester-based urethane component and an acryl component are more preferable, and a polycarbonate-based urethane acryl copolymer is still more preferable. These polyurethanes may be used either alone as one kind or as a combination of two or more kinds.

The polycarbonate-based urethane acryl copolymer can be obtained, for example, by copolymerization of a polycarbonate-based urethane, which is obtained by allowing a carbonate diol to react with a diisocyanate, and a diol having an acryl backbone. Further, the polycarbonate-based urethane acryl copolymer can also be obtained by allowing a carbonate diol and a diisocyanate to react with a diol having an acryl backbone. Here, a specific example of the diol having an acryl backbone may be a compound in which two hydroxyl groups have been introduced into (meth)acrylic acid, an alkyl (meth)acrylate in which the carbon number of the alkyl group is about 1-6, or an oligomer or prepolymer (polymerization degree of about 2-10) obtained by radical polymerization of these. Examples of the diisocyanate include aliphatic isocyanates such as hexamethylene diisocyanate; and alicyclic isocyanates such as isophorone diisocyanate and hydrogenated xylylene diisocyanate. Further, a specific example of the carbonate diol may be a compound represented by the following general formula (3) (in the formula, $R^5$ represents an alkylene group having a carbon number of 1-12 and optionally having a substituent, a divalent heterocyclic group having a carbon number of 1-12 and optionally having a substituent, or a divalent alicyclic group having a carbon number of 1-12 and optionally having a substituent, and m1 is an integer of 1-10).

[Chemical formula 5]

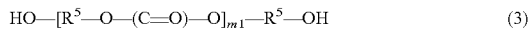

$$HO-[R^5-O-(C=O)-O]_{m1}-R^5-OH \quad (3)$$

Further, the polycarbonate-based urethane acryl copolymer can also be obtained by radical polymerization of a polycarbonate-based polyurethane prepolymer having a radically polymerizable group introduced therein with an acryl monomer. Specific examples of the acryl monomer include (meth)acrylic acid and an alkyl (meth)acrylate in which the carbon number of the alkyl group is about 1-6.

The polyester-based urethane acryl copolymer can be obtained, for example, by copolymerization of a polyester-based urethane, which is obtained by allowing an ester diol to react with a diisocyanate, and a diol having an acryl backbone. Alternatively, the polyester-based urethane acryl copolymer can also be obtained by allowing an ester diol and a diisocyanate to react with a diol having an acryl backbone. Here, examples of the diol having an acryl backbone and the diisocyanate are the same as those used for production of the polycarbonate-based urethane acryl copolymer. Further, a specific example of the ester diol may be a compound represented by the following general formula (4) (in the formula, $R^6$ represents an alkylene group having a carbon number of 1-12 and optionally having a substituent, a divalent heterocyclic group having a carbon number of 1-12 and optionally having a substituent, or a divalent alicyclic group having a carbon number of 1-12 and optionally having a substituent, and m2 is an integer of 1-10).

[Chemical formula 6]

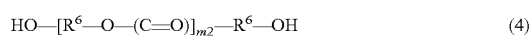

$$HO-[R^6-O-(C=O)]_{m2}-R^6-OH \quad (4)$$

Further, the polyester-based urethane acryl copolymer can also be obtained by radical polymerization of a polyester-based polyurethane prepolymer having a radically polymerizable group introduced therein with an acryl monomer. Examples of the acryl monomer are the same as those used for production of the polycarbonate-based urethane acryl copolymer.

The average molecular weight of the polyurethane is not particularly limited; however, the average molecular weight may be, for example, 40000-100000, preferably 50000-80000. Here, the average molecular weight of a polyurethane refers to a weight-average molecular weight as determined by GPC analysis and converted in terms of standard polystyrene.

In the polyurethane containing an acryl component, the content of the acryl component is not particularly limited; however, the content may be, for example, 1-30% by mass, preferably 5-20% by mass. Here, the content of the acryl component is a ratio (% by mass) that is occupied by the monomers constituting the acryl backbone per a total mass of the polyurethane. The content of the acryl component in the polyurethane is calculated by measuring an NMR spectrum of the polyurethane and calculating the ratio of the peak area attributed to the acryl component relative to the total peak area.

Further, the glass transition point of the primer layer 4 is not particularly limited; however, the glass transition point of the primer layer 4 is preferably lower than that of the cured product constituting the cured layer 2. By setting the glass transition point of the primer layer 4 to be lower than that of the cured product constituting the cured layer 2 in this manner, the adhesion to the cured layer 2 can be enhanced, whereby the organic glass laminate can be furthermore effectively provided with excellent weather resistance and abrasion resistance, and also the property of following the bending process and the adhesion can be maintained. The glass transition point of the primer layer 4 may be specifically, for example, 0-150° C., preferably 10-120° C., and more preferably 20-100° C. Here, in the present specification, the glass transition point of the primer layer 4 is a value as measured by the dynamic viscoelasticity measurement method (DMA; Dynamic Mechanical Analysis), and a specific measurement method thereof is the same as that of the cured product of the cured layer 2.

The glass transition point of the primer layer 4 can be adjusted by suitably setting the kind of the binder that is put to use. In particular, since the polyurethane containing an acryl component can be provided with the glass transition point, the polyurethane is suitable as a binder resin for forming the primer layer 4.

The primer layer 4 may contain an ultraviolet absorbent in accordance with the needs in order to provide a furthermore excellent weather resistance. The kind of the ultraviolet absorbent used in the primer layer 4 is the same as that of the ultraviolet absorbent used in the cured layer 2.

The content of the ultraviolet absorbent in the primer layer 4 is not particularly limited; however, the ultraviolet absorbent may be contained, for example, at 1-50 parts by mass, preferably at 2-40 parts by mass, and more preferably at 3-35 parts by mass, relative to a total of 100 parts by mass of the binder resin.

Also, the primer layer 4 may contain, in addition to the above-described components, a light stabilizer in accordance with the needs in order to further improve the furthermore excellent weather resistance. The kind of the stabilizer used in the primer layer 4 is the same as that of the light stabilizer used in the cured layer 2.

The content of the light stabilizer in the primer layer 4 is not particularly limited, and may be, for example, 0.5-20 parts by mass, preferably 1-15 parts by mass, and more preferably 2-10 parts by mass, relative to a total of 100 parts by mass of the binder resin.

Further, the primer layer 4 may contain a curing agent in accordance with the needs in order to promote curing of the binder resin or to provide the glass transition point described above. Examples of the curing agent used in the primer layer 4 include isocyanate-based curing agents such as tolylene diisocyanate, diphenylmethane diisocyanate, hexamethylene diisocyanate, xylylene diisocyanate, cyclohexanephenylene diisocyanate, and naphthalene-1,5-diisocyanate. These curing agents may be used either alone as one kind or as a combination of two or more kinds.

The content of the curing agent in the primer layer 4 is not particularly limited, and may be, for example, 5-40 parts by mass, preferably 8-35 parts by mass, and more preferably 10-30 parts by mass, relative to a total of 100 parts by mass of the binder resin.

Further, the primer layer 3 may contain an antiblocking agent in accordance with the needs in order to suppress the blocking phenomenon. Examples of the antiblocking agent used in the primer layer 3 include inorganic particles such as silica, alumina, aluminum hydroxide, barium sulfate, talc, and calcium carbonate. These antiblocking agents may be used either alone as one kind or as a combination of two or more kinds. Further, the average particle size of the antiblocking agent is not particularly limited; however, the average particle size is typically about 0.1-10 μm, preferably 0.5-8 μm, and more preferably 0.5-5 μm, in view of transparency and suppression of generation of the blocking phenomenon. The particle size of the antiblocking agent is a value as measured with use of a laser diffraction type particle size distribution measurement apparatus.

The content of the antiblocking agent in the primer layer 4 is not particularly limited, and may be, for example, 1-20 parts by mass, preferably 2-15 parts by mass, and more preferably 3-10 parts by mass, relative to a total of 100 parts by mass of the binder resin.

Furthermore, in accordance with the needs, the primer layer 4 may contain various kinds of additives other than those described above within a range that does not deteriorate the effect of the present invention. Examples of such additives include abrasion resistance improvers, infrared absorbents, antistatic agents, adhesiveness improvers, leveling agents, thixotropy imparting agents, coupling agents, plasticizers, antifoaming agents, filling agents, and coloring agents. These additives can be used by being suitably selected from those conventionally used.

The thickness of the primer layer 4 is not particularly limited, and may be, for example, 0.5-20 μm, preferably 1-10 μm.

The primer layer 4 is formed by applying a resin composition containing a binder resin for forming the primer layer 4 onto a predetermined layer by a known customary application method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, free-flowing coating, brush painting, or spray coating, or the transfer coating method. Here, the transfer coating method is a method of forming an applied film of a layer to be transferred on a thin sheet (sheet different from the film base material) and thereafter covering a surface of a predetermined layer to be laminated, with the applied film.

The resin composition for the primer layer 4 may be one in which the binder resin and additives that are added in accordance with the needs are dissolved or dispersed in a solvent. The solvent that is used in the resin composition for the primer layer 4 may be a solvent that exhibits a solubility or compatibility with the binder resin and the additives that are added in accordance with the needs. The solvent may be suitably selected in accordance with the method of applying the resin composition for the primer layer 4, the method of drying at the time of forming the primer layer 4, or the like; however, an organic solvent is preferable from the viewpoint of solubility or compatibility with the binder resin, drying property, or the like. The organic solvent is not particularly limited, and examples thereof include alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used either alone as one kind or as a combination of two or more kinds.

[Adhesive Layer 5]

The adhesive layer 5 is a layer that is disposed between the organic glass base substrate 1 and the cured layer 2 in accordance with the needs in order to enhance adhesion to the organic glass base substrate 1. When the primer layer 4 is provided, the adhesive layer 5 may be disposed between the organic glass base substrate 1 and the primer layer 4.

It is sufficient that the adhesive layer 4 is an adhesive layer constituted of an adhesive resin such as a heat-sensitive adhesive or a pressure-sensitive adhesive; however, a preferable example thereof is a heat-sealing layer that exhibits a welding function by being heated. Specific examples of the adhesive resin constituting the adhesive layer 4 include acrylic resin, vinyl chloride resin, vinyl acetate resin, vinyl chloride-vinyl acetate copolymer resin, styrene-acryl copolymer resin, polyester resin, polyamide resin, and polyolefin resin. These adhesive resins may be used either alone as one kind or in combination of two or more kinds.

The thickness of the adhesive layer 4 may be typically 0.1-10 μm, preferably 0.5-6 μm, more preferably 1-4 μm.

The adhesive layer 4 is formed by applying an adhesive resin onto a predetermined layer to be laminated by a method such as gravure coating, bar coating, roll coating, reverse roll coating, or comma coating.

[Resin Film Layer 6]

The resin film layer 6 is a layer that is provided between the organic glass base substrate 1 and the cured layer 2 in accordance with the needs for supporting the cured layer 2 and improving the adhesion to the organic glass base substrate 1. When the primer layer 4 is provided, the resin film layer 6 is disposed between the organic glass base substrate 1 and the primer layer 4.

In the organic glass laminate of the present invention, a transparent resin that is used in a general transparent base material film can be used as the resin film layer 6. Preferable examples of the resin constituting the resin film layer 6 include resins such as a cycloolefin resin obtained from cycloolefin such as norbornene, dicyclopentadiene, or tetracyclododecene, a silicone resin, a polycarbonate resin, an epoxy resin, an acrylic resin such as polymethyl methacrylate or polybutyl methacrylate, a phenolic resin, a polyimide resin, a benzooxazine resin, an oxetane resin, and a polyester resin such as a polyethylene terephthalate resin or a polybutylene terephthalate resin. Among these, more preferable examples include a polycarbonate resin, an acrylic resin, and a polyester resin, and still more preferable examples include an acrylic resin from the viewpoint of providing a more excellent transparency.

Further, in addition to the above-described transparent resin, various kinds of additives may be contained in the resin film layer 6 in accordance with the needs. Examples of the additives such as these include a plasticizer, a stabilizer, a matting agent, an ultraviolet absorbent, and an infrared absorbent.

Furthermore, the resin film layer 6 may be subjected to a surface treatment with corona discharge, glow discharge, UV radiation, or the like in accordance with the needs.

The thickness of resin film layer 6 may be typically 50-300 μm, preferably 75-200 μm, and more preferably 75-150 μm.

[Colored Layer 9]

The colored layer 9 is a layer that is provided between the organic glass base substrate 1 and the inorganic oxide film 3 in accordance with the needs for the purpose of concealing an adhesive application part in fixing the organic glass laminate of the present invention, displaying information, imparting a design property, or the like.

For example, when the organic glass laminate of the present invention is used as a window frame member of an automobile, a method of fixing the organic glass laminate can be selected from among fixation with an adhesive, insertion, fixation with a screw, and the like; however, fixation with an adhesive is preferred in view of facility in working. At that time, when the whole surface of the organic glass laminate is transparent, the adhesive application part is liable to be visible, thereby raising a fear of degrading the outer appearance. By providing the colored layer 9 for the purpose of concealing at a site such as this corresponding to a region which is not desired to be visible from outside, the region can be concealed. Also, in the case in which it is desired to display information on the manufacturer, regulations, and the like or to impart a design such as a pattern, the colored layer 9 can display the information or impart the design.

It is sufficient that the colored layer 9 is provided between the organic glass base substrate 1 and the inorganic oxide film 3. For example, when the primer layer 4 and the adhesive layer 5 are provided, the colored layer 9 may be disposed between the inorganic oxide film 3 and the cured layer 2 and/or between the cured layer 2 and the primer layer 4 and/or between the primer layer 4 and the adhesive layer 5 and/or between the adhesive layer 5 and the organic glass base substrate 1; however, the colored layer 9 is preferably disposed between the primer layer 4 and the adhesive layer 5 from the viewpoint of adhesion and weather resistance. Further, for example, when the resin film layer 7 and the primer layer 4 are provided, the colored layer 9 may be disposed between the resin film layer 7 and the primer layer and/or between the primer layer and the cured layer; however, the colored layer 9 is preferably disposed between the resin film layer 7 and the primer layer from the viewpoint of adhesion and weather resistance.

Also, in the organic glass laminate of the present invention, two or more layers having different color tones may be provided at the same placement site or at different placement sites as the colored layer 9. For example, a colored layer 9 exhibiting a black color and a colored layer 9 exhibiting a white color may be provided in this order from the organic glass base substrate 1 side. Alternatively, a colored layer 9 exhibiting a white color and a colored layer 9 exhibiting a black color may be provided in this order from the organic glass base substrate 1 side.

Further, the shape of the colored layer 9 is not particularly limited as long as the colored layer 9 is partially provided when viewed in a direction perpendicular to the surface direction of the organic glass laminate of the present invention, and the shape may be suitably set in accordance with the purpose of use. For example, when the colored layer 9 is provided for the purpose of concealing an adhesive application part in fixing the organic glass laminate of the present invention, the shape of the colored layer 9 is preferably a frame shape that conceals the outer peripheries of the organic glass laminate of the present invention. When the shape of the colored layer 9 is a frame shape that conceals the outer peripheries of the organic glass laminate of the present invention, the width of the colored layer 9 may be set to be, for example, about 10-200 mm. Further, when a frame-shaped colored layer 9 that conceals the outer peripheries of the organic glass laminate of the present invention is provided, a colored layer 9 having a gradation pattern may be further provided at around a neighborhood of the boundary between the frame-shaped colored layer 9 and a region where the frame-shaped colored layer 9 is not provided. Such a gradation pattern can be formed by using a pattern such as a circle (dot), a rectangle (line), a square, or a triangle and setting the pattern to become smaller or setting the color of the pattern to become lighter according as the pattern is more distant from the frame-shaped colored layer 9.

Further, when the colored layer 9 is provided for the purpose of displaying information or imparting a design, the shape of the colored layer 9 may be a letter-shape, a symbol-shape, a numeral-shape, or a patterned shape including a logo of an enterprise, a trademark, or indication of regulations.

The color tone that the colored layer 9 exhibits is not particularly limited, so that any of a colored transparent tone, a colored semitransparent tone, a colored opaque tone, and the like may be adopted in accordance with the purpose of use thereof. For example, when the colored layer 9 is used for the purpose of partially concealing the underlayers, the color tone of the colored layer 9 is preferably a colored opaque tone.

More specifically, when the colored layer 9 is provided for the purpose of concealing, the OD (Optical Density; optical density) value of the colored layer 9 is preferably as high as possible from the viewpoint of imparting an excellent concealment property. Specifically, the OD value may be, for example, 3 or more, preferably 4 or more, and still more preferably 5 or more. Here, the OD value of the colored layer 9 is a value as determined by the following method.

(Method of Measuring the OD Value of the Colored Layer 9)

In the organic glass laminate of the present invention, the OD value of the site where the colored layer 9 is not provided ($OD_{low}$ value) and the OD value of the site where the colored layer 9 is provided ($OD_{high}$ value) are measured. The OD value of the colored layer 9 is a value determined in accordance with a calculation formula ($OD_{high}$ value–$OD_{low}$ value). Here, the $OD_{low}$ value and the $OD_{high}$ value are values as determined by using a transmission densitometer and measuring at a central wavelength of 555 nm.

Further, the above-described OD value of the colored layer 9 can be satisfied by suitably setting the kind and the content of the pigment or dye used for forming the colored layer 9.

The colored layer 9 is formed of a colorant and a binder resin.

As the colorant, either one of or both of a pigment and a dye can be used; however, the coloring agent is preferably a pigment from the viewpoint of durability and weather resistance. Further, the color that the colorant exhibits may be suitably set in accordance with the purpose of use of the colored layer 9; however, when the colored layer 9 is provided for the purpose of concealing, a black pigment is preferable. The kind of the black pigment is not particularly limited, and examples thereof include carbon black, titanium black, perylene black, and azomethineazo-based black.

Further, the binder resin is not particularly limited, and examples thereof include acrylic resin, vinyl chloride resin, vinyl acetate resin, polyester resin, polyimide resin, polyolefin resin, urethane resin, and resins obtained by copolymerization of these resins (for example, urethane-acryl copolymer resin and the like). These binder resins may be either one of a one-liquid curing type and a two-liquid curing type. Also, these binder resins may be used either alone as one kind or as a combination of two or more kinds.

Further, the colored layer 9 may contain additives such as a polymerization inhibitor, a cross-linking agent, an infrared absorbent, an antistatic agent, an adhesiveness improver, a leveling agent, a thixotropy imparting agent, a coupling agent, a plasticizer, an antifoaming agent, a filling agent, a coloring agent, and a filler in accordance with the needs.

The thickness of the colored layer 9 may be suitably set in accordance with the purpose of use thereof, the OD value to be set, the kind and the content of the colorant to be used, and the like; however, the thickness may be typically 0.1-20 μm, preferably 1-15 μm, and more preferably 3-10 μm.

The colored layer 9 is formed, for example, by applying an ink composition for the colored layer 9, which contains a colorant, a binder resin, and additives that are added in accordance with the needs, onto a predetermined layer by a method such as gravure coating, screen printing, offset printing, flexographic printing, comma-coating, inkjet printing, or a dispenser.

The ink composition for forming the colored layer 9 may be one in which the colorant, the binder resin and additives that are added in accordance with the needs are dissolved or dispersed in a solvent. The solvent that is used in the ink composition for the colored layer 9 may be a solvent that exhibits a solubility or compatibility with the colorant, the binder resin and the additives that are added in accordance with the needs. The solvent may be suitably selected in accordance with the method of applying the ink composition for the colored layer 9, the method of drying at the time of forming the colored layer 9, or the like; however, an organic solvent is preferable from the viewpoint of solubility or compatibility with the colorant and the binder resin, drying property, or the like. The organic solvent is not particularly limited, and examples thereof include alcohols such as methanol, ethanol, and isopropanol; esters such as ethyl acetate, butyl acetate, and propylene glycol monomethyl ether acetate; and ketones such as acetone, methyl ethyl ketone, cyclopentanone, cyclohexanone, isobutyl ketone, and methyl isobutyl ketone. These organic solvents may be used either alone as one kind or as a combination of two or more kinds.

Usage of Organic Glass Laminate

The organic glass laminate of the present invention is used as an exterior member. Since the organic glass laminate of the present invention is provided with excellent weather resistance and abrasion resistance, the organic glass base substrate can sufficiently satisfy the performances demanded as an exterior member that is used in an environment exposed to direct sunlight, wind, and rainfall. In the present invention, the term "exterior member" is meant to include not only members directly exposed to sunlight, wind, and rainfall (window member, roof member, exterior member of a vehicle, and the like) but also semi-exterior members placed outdoors via a buffering member such as eaves (entrance door and the like).

Specific examples of the organic glass laminate of the present invention include exterior members for a vehicle such as an automobile or a railway car (various kinds of windows, sunroof, roof panel, window reflector, winker lamp lens, side mirror, head lamp cover, and the like); an architectural member such as a partition plate of a balcony, a roof member of a terrace or a carport, an entrance door, or a window of an architectural structure; a wall material of a sound barrier wall or a wind barrier wall; and a lens used in a traffic signal. Among these, the organic glass laminate of the present invention can be suitably used as an exterior member of a vehicle, particularly a window for an automobile.

Method of Producing Organic Glass Laminate

A method of producing the organic glass laminate of the present invention is not particularly limited as long as the above-described layer structure can be formed, and the method may be, for example, a method of preparing a laminating sheet for use in organic glass in which the layers other than the organic glass base substrate 1 and the inorganic oxide film 3 are laminated in advance, laminating the layers including at least the cured layer 2 onto the organic glass base substrate 1 by using the laminating sheet for use in organic glass, and thereafter forming the inorganic oxide film 3 having a predetermined thickness on the cured layer 2 (which may hereafter be referred to as the "first method"); a method of preparing a laminating sheet for use in organic glass in which the layers other than the organic glass base substrate 1 are laminated in advance, and laminating the layers including at least the inorganic oxide film 3 and the cured layer 2 onto the organic glass base substrate 1 by using the laminating sheet for use in organic glass, thereby to form the cured layer 2 and the inorganic oxide film 3 having a predetermined thickness on the organic glass base substrate 1 (which may hereafter be referred to as the "second method"); and a method of sequentially laminating each of the layers on the glass substrate 1 (which may hereafter be referred to as the "third method"). The first method and second method are suitable as a method of producing the organic glass laminate of the present invention because the organic glass laminate can be efficiently produced, and moreover, a bent organic glass laminate can be conveniently produced without generating cracks in the inorganic oxide film. In particular, in the second method, the inorganic oxide film 3 is formed on the laminating sheet for use in organic glass in advance instead of forming the inorganic oxide film 3 on the organic glass base substrate 1, so that the inorganic oxide film 3 having a uniform film thickness can be easily formed without being affected by the three-dimensional shape of the organic glass base substrate. Therefore, the second method is particularly suitable as a method of producing the organic glass laminate of the present invention. Hereafter, the first method, second method, and third method will be described.

[First Method]

In the first method, a step of laminating at least a cured layer 2 onto an organic glass base substrate 1 by using a laminating sheet for use in organic glass in which at least the cured layer 2 has been laminated on a base material film (which may hereafter be referred to as a "first laminating sheet for use in organic glass") and a step of forming an inorganic oxide film 3 having a thickness of 0.01 μm or more and less than 0.5 μm on the cured layer 2 that has been laminated on the organic glass base substrate 1 are carried out.

The method of laminating the cured layer 2 onto the organic glass base substrate 1 by using the first laminating sheet for use in organic glass may be, for example, a method in which the cured layer 2 provided in the first laminating sheet for use in organic glass is transferred onto the organic glass base substrate 1 thereby to laminate the cured layer 2 onto the organic glass base substrate 1 (which may hereafter be referred to as a "transfer method"); or a method of laminating (performing lamination of) the first laminating sheet for use in organic glass itself onto an organic glass thereby to laminate the cured layer 2 onto the organic glass base substrate 1 (which may hereafter be referred to as a "lamination method").

It is sufficient that the first laminating sheet for use in organic glass is a sheet in which at least the cured layer 2 is laminated on the base material film, and the layer structure thereof is suitably set depending on whether the transfer method is adopted or the lamination method is adopted.

Figure 5:
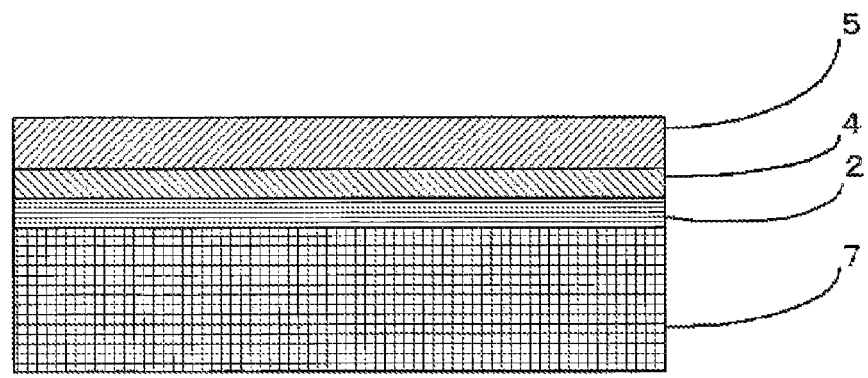
FIG. 5 is a view showing one example of a lamination structure of a laminating sheet for use in organic glass used in the transfer method.
Figure 6:
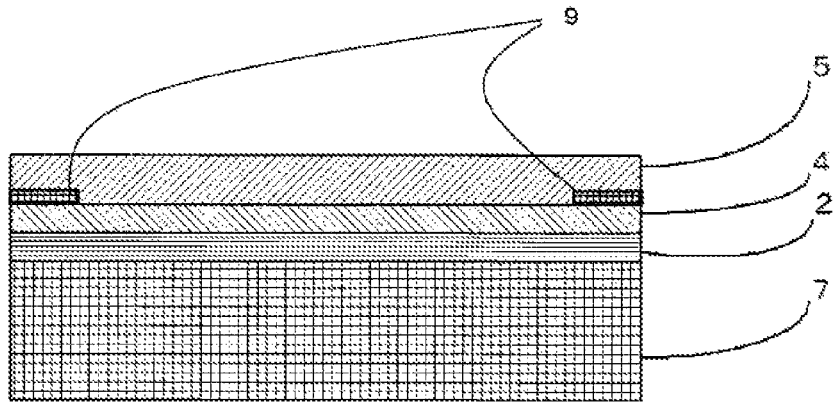
FIG. 6 is a view showing one example of a lamination structure of a laminating sheet for use in organic glass used in the transfer method.

Specifically, it is sufficient that the first laminating sheet for use in organic glass used in the transfer method (which may hereafter be referred to as a "first transfer sheet") is a sheet in which a release film layer 7 is used as the base material film, and at least the cured layer 2 is laminated on the release film layer 7. Further, when the primer layer 4, the adhesive layer 5, the resin film layer 6, and/or the colored layer 9 are provided in the produced organic glass laminate, it is sufficient that these layers are laminated in a predetermined arrangement in the transfer sheet. In the first transfer sheet, the uppermost surface opposite to the release film layer 7 is a surface that is brought into contact with the organic glass base substrate 1. One example of a suitable layer structure of the first transfer sheet is a layer structure in which the release film layer 7, the cured layer 2, the primer layer 4, and the adhesive layer 5 are laminated in this order. The lamination structure of the first transfer sheet is shown in FIG. 5. Further, another example of a suitable layer structure of the first transfer sheet is a layer structure in which the release film layer 7, the cured layer 2, the primer layer 4, the colored layer 9, and the adhesive layer 5 are laminated in this order. The lamination structure of the first transfer sheet is shown in FIG. 6.

In the first transfer sheet, the resin constituting the release film layer 7 is not particularly limited as long as the release film layer 7 can be delaminated from the cured layer 2, and examples thereof that are put to use include a polyolefin-based resin such as polyethylene or polypropylene; a vinyl-based resin such as polyvinyl chloride, polyvinylidene chloride, polyvinyl alcohol, ethylene-vinyl acetate copolymer, or ethylene-vinyl alcohol copolymer; a polyester-based resin such as polyethylene terephthalate, polybutylene terephthalate, or polyethylene naphthalate; an acryl-based resin such as polymethyl (meth)acrylate or polyethyl (meth)acrylate; a styrene-based resin such as polystyrene, acrylonitrile-butadiene-styrene copolymer, cellulose triacetate, cellophane, polycarbonate, and an elastomer-based resin such as polyurethane-based resin. Among these resins, a polyester-based resin can be mentioned as a preferable example, and polyethylene terephthalate can be mentioned as a more preferable example, because of having a good moldability and a good delamination property.

The release film layer 7 may be made of a single layer formed by using a single resin, or may be made of plural layers formed by using the same kind of resin or different kinds of resins. Also, the release film layer 7 may be subjected to arbitrary coating or treatment for adjusting the peeling strength.

Figure 7:
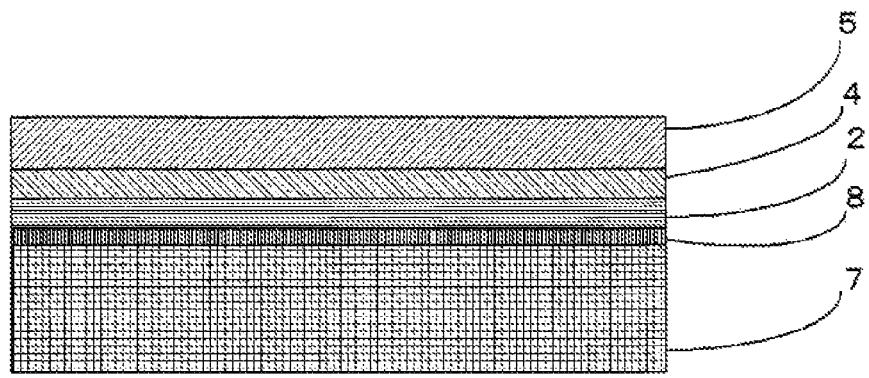
FIG. 7 is a view showing one example of a lamination structure of a laminating sheet for use in organic glass used in the transfer method.
Figure 8:
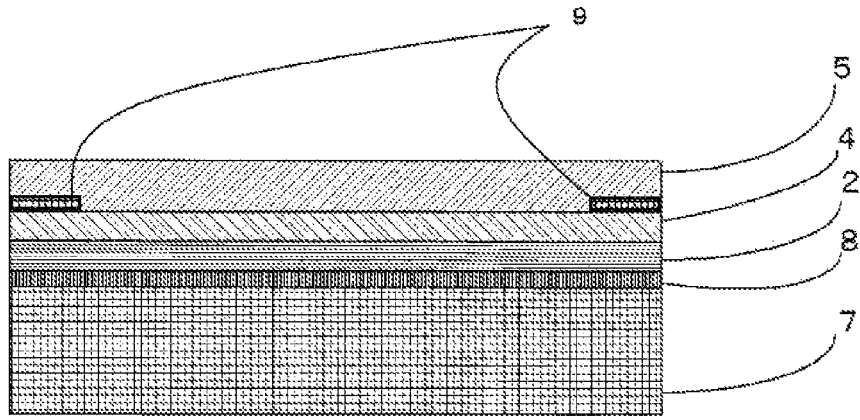
FIG. 8 is a view showing one example of a lamination structure of a laminating sheet for use in organic glass used in the transfer method.

Further, on the release film layer 7, a release layer 8 may be provided on the side that is in contact with the cured layer 2 in accordance with the needs in order to adjust the peeling strength to the cured layer 2. One example of a suitable layer structure of the first transfer sheet provided with the release layer 8 is a layer structure in which the release film layer 7, the release layer 8, the cured layer 2, the primer layer 4, and the adhesive layer 5 are laminated in this order. The lamination structure of the first transfer sheet is shown in FIG. 7. Further, another example of a suitable layer structure of the first transfer sheet provided with the release layer 8 is a layer structure in which the release film layer 7, the release layer 8, the cured layer 2, the primer layer 4, the colored layer 9, and the adhesive layer 5 are laminated in this order. The lamination structure of the first transfer sheet is shown in FIG. 8.

The release layer 8 is formed of a thermoplastic resin whose peeling strength to the cured layer 2 can be adjusted. Specific examples of the thermoplastic resin constituting the release layer 8 include silicone resin, fluorine-based resin, acryl-melamine-based resin, polyester resin, polyolefin resin, polystyrene resin, polyurethane resin, and vinyl chloride-vinyl acetate resin. The thickness of the release layer 8 may be typically 0.1-10 μm, preferably 0.2-8 μm, and more preferably 0.3-5 μm.

The release layer 8 may be formed by applying the thermoplastic resin onto the release film layer 7 by a method such as gravure coating, bar coating, roll coating, reverse roll coating, or comma coating.

The thickness of the release film layer 7 is not particularly limited; however, the thickness may be typically 20-200 μm, preferably 30-100 μm, and more preferably 40-80 μm.

Figure 9:
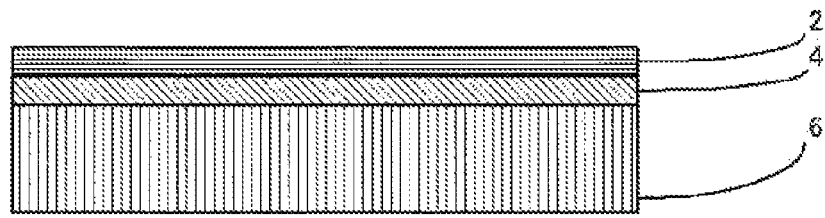
FIG. 9 is a view showing one example of a lamination structure of a laminating sheet for use in organic glass used in the lamination method.
Figure 10:
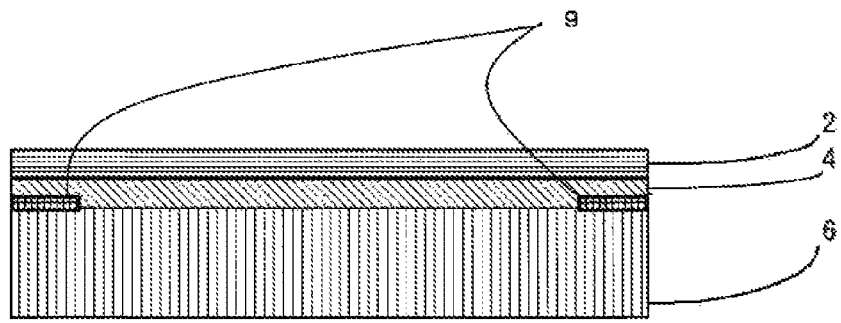
FIG. 10 is a view showing one example of a lamination structure of a laminating sheet for use in organic glass used in the lamination method.

Further, it is sufficient that the first laminating sheet for use in organic glass used in the lamination method (which may hereafter be referred to as a "first lamination sheet") is a sheet in which a resin film layer 6 is used as the base material film, and at least the cured layer 2 is laminated on the resin film layer 6. Further, when the primer layer 4, the adhesive layer 5, and/or the resin film layer 6 are provided in the produced organic glass laminate, it is sufficient that these layers are laminated in a predetermined arrangement in the first lamination sheet. In the first lamination sheet, the uppermost surface on the resin film layer 6 side is a surface that is brought into contact with the organic glass base substrate 1. One example of a suitable layer structure of the first lamination sheet is a layer structure in which the resin film layer 6, the primer layer 4, and the cured layer 2 are laminated in this order. The lamination structure of the first lamination sheet is shown in FIG. 9. Further, another example of a suitable layer structure of the first lamination sheet is a layer structure in which the resin film layer 6, the colored layer 9, the primer layer 4, and the cured layer 2 are laminated in this order. The lamination structure of the first lamination sheet is shown in FIG. 10.

A method of laminating the first laminating sheet for use in organic glass onto the organic glass base substrate 1 may be specifically, for example, a method of press-bonding the first laminating sheet for use in organic glass onto the organic glass base substrate 1 that has been molded in advance (which may hereafter be referred to as the "press-bonding method"); or a method of laminating by integrating with the organic first glass lamination sheet in performing injection-molding of an organic glass resin (which may hereafter be referred to as the "injection-molding integration method"). Hereafter, the method of producing the organic glass laminate of the present invention will be described by classifying the method into the press-bonding method and the injection-molding integration method.

The press-bonding method may be specifically, for example, a method of molding an organic glass base substrate 1 by extrusion molding or the like and press-bonding and laminating a first laminating sheet for use in organic glass onto the organic glass base substrate 1 by using a roll or the like immediately thereafter or after cooling. In press-bonding the first laminating sheet for use in organic glass onto the organic glass base substrate 1, the laminating sheet for use in organic glass may be heated. The heating of the laminating sheet for use in organic glass can be carried out by preliminary heating of the laminating sheet for use in organic glass before the press-bonding, heating simultaneously with the press-bonding that is carried out by using the heat-pressing roll, or the like. Alternatively, the organic glass base substrate 1 may be heated before press-bonding the first laminating sheet for use in organic glass.

Also, when a first transfer sheet is used, the transfer sheet may be press-bonded onto the organic glass base substrate 1, and thereafter the release film layer 7 may be delaminated and removed.

Further, a bending process may be carried out in accordance with the needs after press-bonding the first transfer sheet onto the organic glass base substrate 1. As described before, since the cured layer 2 is provided with an excellent property of following the bending process, the bending process can be carried out without generating delamination, cracks or the like of the cured layer 2 that has been laminated on the organic glass base substrate 1. Furthermore, when the first laminating sheet for use in organic glass is a transfer sheet, the bending process may be carried out either before or after delaminating the base material film 1 for releasing. A technique of the bending process is not particularly limited and may be, for example, a cold bending process, a heat-bending process, or the like; however, the heat-bending process is preferable from the viewpoint of processability. The temperature in performing the heat-bending process is suitably set in accordance with the kind of the organic glass base substrate 1 that is put to use. However, when the organic glass base substrate 1 is formed of polycarbonate, the temperature may be typically 100-250° C., preferably 150-200° C. Further, the curvature radius in the bending process may be suitably set in accordance with the shape of the organic glass laminate or the like.

In the case of the press-bonding method, the first laminating sheet for use in organic glass is preferably provided with an adhesive layer 5 for the purpose of imparting adhesion to the organic glass base substrate 1. Further, in the case of the press-bonding method, it is preferable to use a first transfer sheet from the viewpoint of processability, production efficiency, and the like.

The injection-molding integration method may be specifically, for example, a method of injecting an organic glass resin onto a predetermined one surface of the first laminating sheet for use in organic glass (the surface opposite to the release film layer 7 in the case of the first transfer sheet; the surface on the resin film layer 6 side as viewed from the cured layer 2 in the case of the first lamination sheet) for molding.

More specifically, a method of performing the following Step I and Step II may be mentioned as one mode of integrating the laminating sheet for use in organic glass with the organic glass base substrate 1 by the injection-molding integration method.

Step I: The first laminating sheet for use in organic glass (the surface opposite to the release film layer 7 is disposed on the side of the organic glass resin to be injected in the case of the first transfer sheet; the surface on the resin film layer 6 side as viewed from the cured layer 2 is disposed on the side of the organic glass resin to be injected in the case of the first lamination sheet) is inserted into an injection-molding mold; the injection-molding mold is closed; and the organic glass resin in a fluidized state is injected into the injection-molding mold to integrate the organic glass base substrate 1 with the first laminating sheet for use in organic glass.

Step II: In the case in which the first transfer sheet has been used, the release film layer 7 is delaminated and removed.

In the Step I, in order to facilitate integration of the first laminating sheet for use in organic glass with the injected resin, the laminating sheet for use in organic glass may be subjected to preliminary heating in accordance with the needs before the first laminating sheet for use in organic glass is inserted into the injection-molding mold. Further, even if the first laminating sheet for use in organic glass is not subjected to preliminary heating, the laminating sheet for use in organic glass can be integrated with the injected organic glass resin by the residual heat of the injected organic glass. Further, in the Step I, the laminating sheet for use in organic glass inserted into the injection-molding mold may be subjected to vacuum suction or the like so as to go closely along the surface of the injection-molding mold before the organic glass resin is injected.

Further, in the Step II, the release film layer 7 may be delaminated simultaneously with the separation of the injection-molding mold or after the separation of the injection-molding mold. Alternatively, until the time of use of the organic glass laminate, a state of attachment of the release film layer 7 may be maintained without delaminating the release film layer 7.

In the mode of the injection-molding integration method, it is preferable to use the first lamination sheet from the viewpoint of processability, production efficiency, and the like.

Further, a method of performing the following Step 1 to Step 5 may be mentioned as another mode of integrating the first laminating sheet for use in organic glass with the organic glass base substrate 1 by the injection-molding integration method.

Step 1: The first laminating sheet for use in organic glass is supplied and fixed between a pair of male and female molds in a mold-open state so that a predetermined surface of the first laminating sheet for use in organic glass (the surface opposite to the release film layer 7 in the case of the transfer sheet; the surface on the resin film layer 6 side as viewed from the cured layer 2 in the case of the lamination sheet) may face towards the cavity side. Further, the first laminating sheet for use in organic glass is preliminarily molded by heating and softening the surface of the first laminating sheet for use in organic glass on the side where the organic glass resin is to be injected, performing vacuum suction from the mold side that faces the surface opposite thereto, and allowing the first laminating sheet for use in organic glass to adhere closely along the shape of the movable mold.

Step 2: After the two molds are clamped, the organic glass resin in a fluidized state is injected into the cavity formed by the two molds so that the organic glass resin fills the cavity and is solidified, so as to laminate and integrate the organic glass base substrate with the first laminating sheet for use in organic glass.

Step 3: The movable mold is separated from the fixed mold, and the organic glass laminate in which the organic glass base substrate 1 and the first laminating sheet for use in organic glass have been integrated with each other is taken out.

Step 4: The organic glass laminate is adjusted to have a desired shape by trimming an extraneous part of the organic glass laminate.

Step 5: In the case in which the first transfer sheet is used, the release film layer 7 is delaminated and removed. Here, the present Step 5 may be carried out simultaneously with the separation of the mold in the Step 3 or may be carried out between the Step 3 and the Step 4.

After the cured layer 2 is laminated onto the organic glass base substrate 1 by the press-bonding method or the injection-molding integration method in this manner, an inorganic oxide film 3 having a thickness of 0.01 μm or more and less than 0.5 μm is formed on the cured layer 2, whereby the organic glass laminate of the present invention is obtained. The method of forming the inorganic oxide film 3 is as described above.

Further, in accordance with the needs, a bending process may be carried out on the laminate in which the cured layer 2 has been laminated on the organic glass base substrate 1 before or after the inorganic oxide film 3 is formed on the cured layer 2. The technique of the bending process is as described above.

[Second Method]

In the first method, a step of laminating a cured layer 2 and an inorganic oxide film 3 having a thickness of 0.01 μm or more and less than 0.5 μm onto an organic glass base substrate 1 by using a laminating sheet for use in organic glass in which at least the cured layer 2 and the inorganic oxide film 3 have been laminated on a base material film (which may hereafter be referred to as a "second laminating sheet for use in organic glass") is carried out.

The method of laminating the cured layer 2 and the inorganic oxide film 3 onto the organic glass base substrate 1 by using the second laminating sheet for use in organic glass may be, for example, a transfer method in which the cured layer 2 and the inorganic oxide film 3 provided in the second laminating sheet for use in organic glass is transferred onto the organic glass base substrate 1 thereby to laminate the cured layer 2 and the inorganic oxide film 3 onto the organic glass base substrate 1; or a lamination method of laminating (performing lamination of) the second laminating sheet for use in organic glass itself onto an organic glass thereby to laminate the cured layer 2 and the inorganic oxide film 3 onto the organic glass base substrate 1. In the second method, the lamination method is preferable from the viewpoint of furthermore efficiently producing the organic glass laminate of the present invention.

It is sufficient that the second laminating sheet for use in organic glass is a sheet in which at least the cured layer 2 and the inorganic oxide film 3 having a thickness of 0.01 μm or more and less than 0.5 μm are laminated on the base material film, and the layer structure thereof is suitably set depending on whether the transfer method is adopted or the lamination method is adopted.

Figure 11:
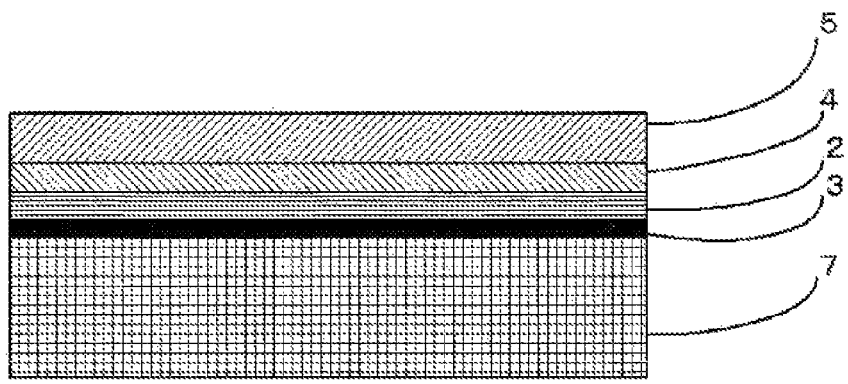
FIG. 11 is a view showing one example of a lamination structure of a laminating sheet for use in organic glass used in the transfer method.
Figure 12:
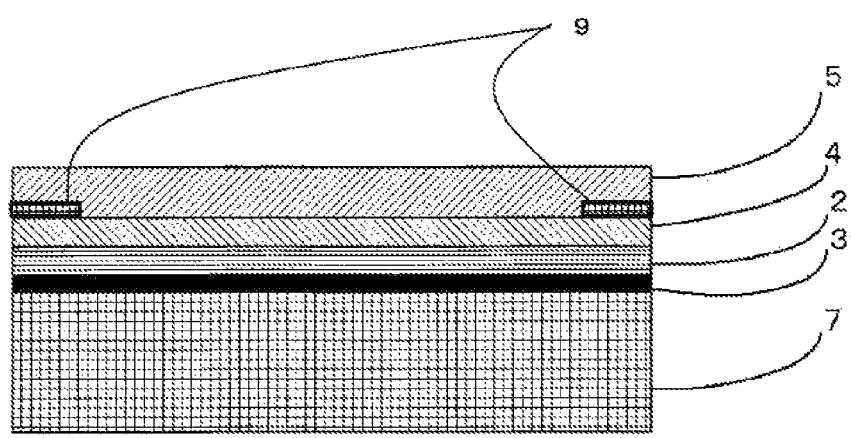
FIG. 12 is a view showing one example of a lamination structure of a laminating sheet for use in organic glass used in the transfer method.

Specifically, it is sufficient that the second laminating sheet for use in organic glass used in the transfer method (which may hereafter be referred to as a "second transfer sheet") is a sheet in which a release film layer 7 is used as the base material film, and at least the inorganic oxide film 3 having a thickness of 0.01 μm or more and less than 0.5 μm and the cured layer 2 are laminated in this order on the release film layer 7. Further, when the primer layer 4, the adhesive layer 5, the resin film layer 6, and/or the colored layer 9 are provided in the produced organic glass laminate, it is sufficient that these layers are laminated in a predetermined arrangement in the transfer sheet. In the second transfer sheet, the uppermost surface opposite to the release film layer 7 is a surface that is brought into contact with the organic glass base substrate 1. One example of a suitable layer structure of the second transfer sheet is a layer structure in which the release film layer 7, the inorganic oxide film 3, the cured layer 2, the primer layer 4, and the adhesive layer 5 are laminated in this order. The lamination structure of the second transfer sheet is shown in FIG. 11. Further, another example of a suitable layer structure of the second transfer sheet is a layer structure in which the release film layer 7, the inorganic oxide film 3, the cured layer 2, the primer layer 4, the colored layer 9, and the adhesive layer 5 are laminated in this order. The lamination structure of the second transfer sheet is shown in FIG. 12.

Figure 13:
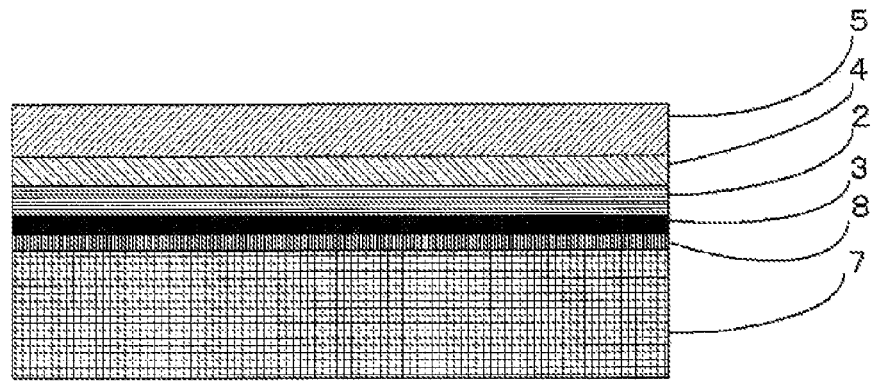
FIG. 13 is a view showing one example of a lamination structure of a laminating sheet for use in organic glass used in the transfer method.
Figure 14:
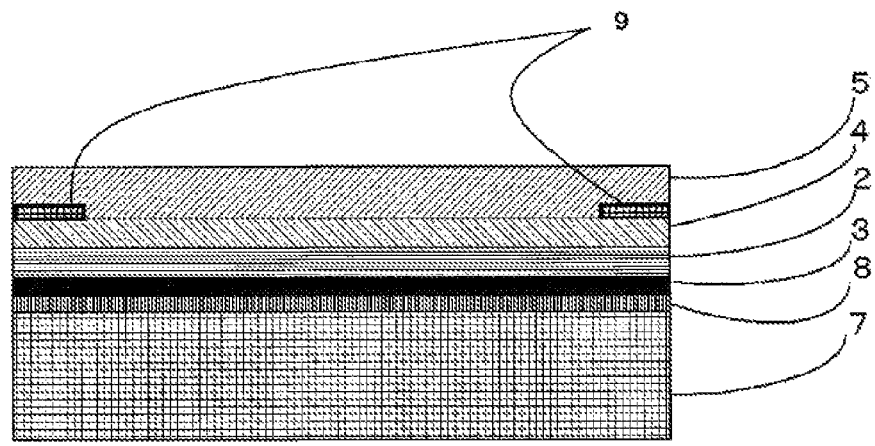
FIG. 14 is a view showing one example of a lamination structure of a laminating sheet for use in organic glass used in the transfer method.

The kind, the structure, the thickness, and the like of the resin constituting the release film layer 7 provided in the second transfer sheet are the same as those of the aforementioned first transfer sheet. Further, on the release film layer 7, a release layer 8 may be provided on the side that is in contact with the inorganic oxide film 3 in accordance with the needs in order to adjust the peeling strength to the inorganic oxide film 3. One example of a suitable layer structure of the second transfer sheet provided with the release layer 8 is a layer structure in which the release film layer 7, the release layer 8, the inorganic oxide film 3, the cured layer 2, the primer layer 4, and the adhesive layer 5 are laminated in this order. The lamination structure of the second transfer sheet is shown in FIG. 13. Furthermore, another example of a suitable layer structure of the second transfer sheet provided with the release layer 8 is a layer structure in which the release film layer 7, the release layer 8, the inorganic oxide film 3, the cured layer 2, the primer layer 4, the colored layer 9, and the adhesive layer 5 are laminated in this order. The lamination structure of the second transfer sheet is shown in FIG. 14. The kind, the thickness, the method of forming, and the like of the resin used for forming the release layer 8 are the same as those of the aforementioned first transfer sheet.

Figure 15:
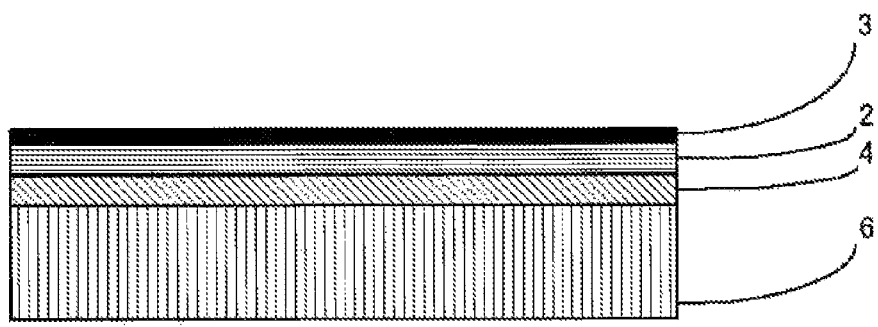
FIG. 15 is a view showing one example of a lamination structure of a laminating sheet for use in organic glass used in the lamination method.
Figure 16:
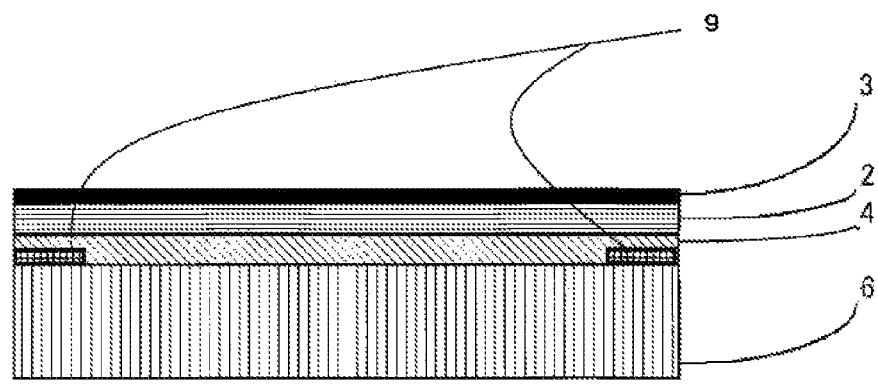
FIG. 16 is a view showing one example of a lamination structure of a laminating sheet for use in organic glass used in the lamination method.

Further, it is sufficient that the second laminating sheet for use in organic glass used in the lamination method (which may hereafter be referred to as a "second lamination sheet") is a sheet in which a resin film layer 6 is used as the base material film, and at least the cured layer 2 and the inorganic oxide film 3 having a thickness of 0.01 μm or more and less than 0.5 μm are laminated in this order on the resin film layer 6. Further, when the primer layer 4, the adhesive layer 5, and/or the resin film layer 6 are provided in the produced organic glass laminate, it is sufficient that these layers are laminated in a predetermined arrangement in the second lamination sheet. In the second lamination sheet, the uppermost surface on the resin film layer 6 side is a surface that is brought into contact with the organic glass base substrate 1. One example of a suitable layer structure of the second lamination sheet is a layer structure in which the resin film layer 6, the primer layer 4, the cured layer 2, and the inorganic oxide film 3 are laminated in this order. The lamination structure of the second lamination sheet is shown in FIG. 15. Further, another example of a suitable layer structure of the second lamination sheet is a layer structure in which the resin film layer 6, the colored layer 9, the primer layer 4, the cured layer 2, and the inorganic oxide film 3 are laminated in this order. The lamination structure of the second lamination sheet is shown in FIG. 16.

A method of laminating the second laminating sheet for use in organic glass onto the organic glass base substrate 1 may be specifically, for example, the press-bonding method and the injection-molding integration method. In the second method, specific methods of the press-bonding method and the injection-molding integration method are the same as those of the case in which the aforementioned first laminating sheet for use in organic glass is used.

Further, a bending process may be carried out in accordance with the needs after laminating the second laminating sheet for use in organic glass onto the organic glass base substrate 1. The technique of the bending process is as described above.

[Third Method]

In the third method, at least the cured layer 2 and the inorganic oxide film 3 having a thickness of 0.01 µm or more and less than 0.5 µm are laminated in this order on the glass substrate 1. When the primer layer 4, the adhesive layer 5, and/or the resin film layer 6 are provided in the organic glass laminate, it is sufficient that these layers are laminated in a predetermined arrangement. The method of forming each layer is as described above.

Further, in the third method, a bending process may be carried out in accordance with the needs while each layer is being formed or after all the layers are formed. The technique of the bending process is as described above.

2. Laminating Sheet for Use in Organic Glass

The present invention provides a laminating sheet for use in organic glass for producing an organic glass laminate by the first method and second method. The layer structure of the laminating sheet for use in organic glass is suitably set in accordance with the mode of use (whether the transfer method is adopted or the lamination method is adopted). The layer structure of the laminating sheet for use in organic glass for each mode of use is as described above.

EXAMPLES

Hereafter, the present invention will be described in detail by showing Examples and Comparative Examples. However, the present invention is not limited to the Examples. Here, in the following Examples and Comparative Examples, measurement of the glass transition point was carried out all by the DMA method except for the cured layer of the Comparative Examples 5-8. Because the cured layer of the Comparative Examples 5-8 could not be subjected to measurement by the DMA method, measurement of the glass transition point was carried out by the DSC method (differential scanning calorimetry measurement).

1. Production of Organic Glass Laminate

Example 1

An organic glass laminate was produced by the aforementioned first method with use of a laminating sheet for use in organic glass (first transfer sheet) having a cured layer, a primer layer, and an adhesive layer laminated in this order on a release film layer. A specific method of production is as follows.

A cured-layer forming resin composition 1 having the following composition was applied onto a release film layer (having a thickness of 75 µm) made of polyethylene terephthalate to a thickness of 3 µm, followed by curing with electron beam radiation at 10 Mrad to laminate a cured layer on the release film layer. Subsequently, a corona discharge treatment was carried out on the cured layer surface, and thereafter a primer layer forming resin composition A having the following composition was applied thereon by the gravure reverse method to form a primer layer having a thickness of 3 µm. Further, a heat-fusion resin (acrylic resin) was applied onto the primer layer by the gravure reverse method to form an adhesive layer having a thickness of 4 µm. Thus, a laminating sheet for use in organic glass (first transfer sheet) having the cured layer, the primer layer, and the adhesive layer laminated sequentially on the release film layer was obtained.

<Cured-Layer Forming Resin Composition 1 (Glass Transition Point of 91° C. after Curing)>

Hexafunctional urethane acrylate (having a molecular weight of about 1,000): 60 parts by mass Bifunctional caprolactone-modified urethane acrylate (having a molecular weight of about several thousands): 40 parts by mass Hydroxyphenyltriazine-based ultraviolet absorbent: 0.7 part by mass ("Tinuvin479" manufactured by BASF Japan Co., Ltd.)

Light stabilizer having a reactive functional group (1,2,2,6,6-pentamethyl-4-piperidinyl methacrylate, "SANOL LS-3410" manufactured by Nippon Nyukazai Co., Ltd.): 4.2 parts by mass Nonreactive silicone compound (polyether-modified silicone oil): 0.3 part by mass Scratch-resistant filler (silica particles, average particle size: 2 µm): 2 parts by mass <Primer Layer Forming Resin Composition A (Glass Transition Point of 36° C.)>

Polycarbonate-based urethane acryl copolymer*[1]: 100 parts by mass

Hydroxyphenyltriazine-based ultraviolet absorbent*[2]: 17 parts by mass

Hydroxyphenyltriazine-based ultraviolet absorbent*[3]: 13 parts by mass

Hindered amine-based light stabilizer*[4]: 8 parts by mass

Antiblocking agent*[5]: 9 parts by mass

Curing agent (hexamethylene diisocyanate): 25 parts by mass

*[1]: In the polycarbonate-based urethane acryl copolymer that was put to use, the content of the urethane component was 30% by mass, and the weight-average molecular weight was 50000.

*[2]: Tinuvin400 (trade name), 2-[4-[(2-hydroxy-3-dodecyloxypropyl)oxy]-2-hydroxyphenyl]-4,6-bis(2,4-dimethylphenyl)-1,3,5-triazine, manufactured by BASF Japan Co., Ltd.

*[3]: Tinuvin479 (trade name), 2-(2-hydroxy-4-[1-octyloxycarbonylethoxy]phenyl)-4,6-bis(4-phenylphenyl)-1,3,5-triazine, manufactured by BASF Japan Co., Ltd.

*[4]: Tinuvin123 (trade name), bis(1-octyloxy-2,2,6,6-tetramethyl-4-piperidyl) sebacate), manufactured by BASF Japan Co., Ltd.

*[5]: Silica particles, average particle size: 3 µm

Subsequently, the laminating sheet for use in organic glass obtained in the above was integrated with a polycarbonate base substrate by the injection-molding integration method. Specifically, the laminating sheet for use in organic glass was put between a pair of male and female molds (a movable mold and a fixed mold) in a mold-open state, and a resin film was supplied into a cavity and fixed so that the cured layer would be in contact with a resin. Thereafter, the laminating sheet for use in organic glass was preliminarily molded by heating to 100° C. and softening the resin film layer of the laminating sheet for use in organic glass, performing vacuum suction from the mold side facing the cured layer side, and allowing the softened laminating sheet for use in organic glass to adhere closely along the shape of the movable mold. Subsequently, after the two molds were clamped, the polycarbonate resin in a fluidized state was injected into the cavity formed by the two molds so that the polycarbonate resin would fill the cavity and be solidified, thereby to laminate and integrate the formed polycarbonate base substrate and the laminating sheet for use in organic glass. Thereafter, the movable mold was separated from the fixed mold, thereby to obtain a laminate having the polycarbonate base substrate, the adhesive layer, the primer layer, and the cured layer sequentially laminated.

Thereafter, by the following method, an inorganic oxide film made of silicon dioxide was formed by a CVD process on the cured layer of the laminate obtained in the above.

In order to form an inorganic oxide film made of silicon dioxide on the cured layer of the laminate obtained in the above, a plasma CVD apparatus having an electrode structure of parallel flat plate type (manufactured by Anelva Corporation, type number: PED-401) was used. The plasma CVD apparatus had been remodeled so that a high-frequency electric power of 40 kHz would be applied to the lower electrode having a diameter of 325 mm. Further, the temperature of the lower electrode can be set with use of a chiller. The upper electrode is formed as a shower head so as to introduce a gas. A bubbler was placed so as to introduce a fluorine compound, and the temperature was made capable of being set with use of a water bath. A gas is introduced from the bubbler into the plasma CVD apparatus via a needle valve. The pressure of the bubbler can be altered by adjustment of the needle valve.

The laminate obtained in the above was put into a vacuum chamber of the plasma CVD apparatus and placed on the lower electrode. Further, in order to measure a film thickness, a silicon wafer having a surface subjected to mirror finishing was placed in a partially masked state on the lower electrode. The temperature of the lower electrode was set to be 18° C. After the chamber was closed and the pressure was reduced to 5 mTorr (0.67 Pa), bubbling was carried out with use of an argon gas as a carrier gas, and hexamethyldisiloxane as a monomer material was supplied into the vacuum chamber of the plasma CVD apparatus. At this time, the flow rate of the Ar gas was set to be 2.9 sccm; the oxygen gas flow rate was set to be a predetermined value shown in Table 1; the monomer flow rate was set to be 1.0 sccm; the temperature of the bubbler was set to be 25° C.; and the pressure of the bubbler was set to be 160 Torr (21330 Pa). After the pressure within the vacuum chamber was adjusted to be 100 mTorr (13.3 Pa) by adjusting the amount of discharging the gas, a film was formed by setting the electric discharge power to be 104 W. The film-forming time was set to be a predetermined value shown in Table 1. After the film-forming time had passed, the electric discharge was stopped, and the pressure was returned to atmospheric pressure. Thereafter, the support member having the vapor deposition film formed was taken out from the chamber of the CVD apparatus, thereby to obtain an organic glass laminate in which an inorganic oxide film made of silicon dioxide had been formed on the upper surface of the cured layer of the laminate obtained in the above.

The thickness of the obtained silicon dioxide film was confirmed by measuring the step difference between the part where the inorganic oxide film was present and the part where the inorganic oxide film was absent on the silicon wafer with use of a SURFCORDER ET4000L manufactured by Kosaka Laboratory Ltd. The same applies to each of the following Examples and Comparative Examples.

Examples 2-4 and 14

An organic glass laminate was produced under the same conditions as in Example 1 except that the oxygen gas flow rate and the film-forming time at the time of forming the inorganic oxide film were changed to predetermined values shown in Table 1.

Example 5

A laminating sheet for use in organic glass (first transfer sheet) was obtained in the same manner as in Example 1 except that the cured layer was formed by using a cured-layer forming resin composition 2 having the following composition.

<Cured-layer forming resin composition 2 (glass transition point of 95° C. after curing)>
  Hexafunctional ionizing-radiation-curable resin (mixture of 60 parts by mass of hexafunctional urethane acrylate (having a molecular weight of about 1,000) and 40 parts by mass of a bifunctional caprolactone-modified urethane acrylate (having a molecular weight of about several thousands)): 100 parts by mass
  Alicyclic urethane diacrylate having two hydroxyethyl acrylates bonded to isophorone diisocyanate by urethane bond: 16 parts by mass
  Hydroxyphenyltriazine-based ultraviolet absorbent ("Tinuvin479" manufactured by BASF Japan Co., Ltd.): 2.3 parts by mass
  Light stabilizer having a reactive functional group (1,2,2,6,6-pentamethyl-4-piperidinyl methacrylate, "SANOL LS-3410" manufactured by Nippon Nyukazai Co., Ltd.): 4.2 parts by mass
  Nonreactive silicone compound (polyether-modified silicone oil): 0.3 part by mass
  Scratch-resistant filler (silica particles, average particle size: 2 μm): 2 parts by mass Subsequently, a polycarbonate plate having a thickness of 3 mm was molded by extrusion fusion and, in a state in which the molded plate had a residual heat, the laminating sheet for use in organic glass (transfer sheet) obtained in the above was placed on both of upper and lower sides of the molded plate so that the adhesive layer would be on the polycarbonate plate side, followed by press-bonding the laminating sheet for use in organic glass onto both surfaces of the molded plate with use of a heat roll. Thereafter, the release film layer was delaminated to obtain a laminate having the cured layer, the primer layer, the adhesive layer, the polycarbonate plate, the adhesive layer, the primer layer, and the cured layer laminated in this order.

An inorganic oxide film made of silicon dioxide was formed by a CVD process on one surface of the laminate obtained in the above. The conditions of the CVD process were set to be the same as those of Example 1 except that the oxygen gas flow rate and the film-forming time at the time of forming the film were changed to predetermined values shown in Table 1.

Example 6

An organic glass laminate was produced under the same conditions as in Example 1 except that the cured layer was formed by using a cured-layer forming resin composition 3 having the following composition, and that the oxygen gas flow rate and the film-forming time at the time of forming the inorganic oxide film were changed to predetermined values shown in Table 1.

<Cured-Layer Forming Resin Composition 3 (Glass Transition Point of 146° C. after Curing)>

Polyfunctional acrylate having an isocyanurate ring (having a weight-average molecular weight of about 27,000: containing a tetra- to octa-functional acrylate polymer as a major component): 80 parts by mass Bifunctional urethane acrylate monomer[#1] (having a molecular weight of about 400) in which two (meth) acryloyl groups are bonded via an aliphatic chain having a urethane bond: 20 parts by mass Hydroxyphenyltriazine-based ultraviolet absorbent ("Tinuvin479" manufactured by BASF Japan Co., Ltd.): 2.3 parts by mass Light stabilizer having a reactive functional group (1,2,2,6,6-pentamethyl-4-piperidinyl methacrylate, "SANOL LS-3410" manufactured by Nippon Nyukazai Co., Ltd.): 4.2 parts by mass Nonreactive silicone compound (polyether-modified silicone oil): 0.3 part by mass Scratch-resistant filler (silica particles, average particle size: 2 µm): 2 parts by mass #1 The bifunctional urethane acrylate monomer is a monomer in which one molecule of a compound represented by the following formula (X) and two molecules of a compound represented by the following formula (Y) are bonded, where the isocyanate group of the compound represented by the following formula (X) and the hydroxyl group of the compound represented by the following formula (Y) react with each other to form the urethane bond.

[Chemical formula 7]

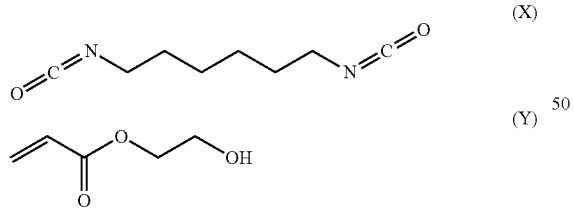

(X)

(Y)

Example 7

An organic glass laminate was produced by the aforementioned first method with use of a laminating sheet for use in organic glass (first lamination sheet) having a primer layer and a cured layer laminated in this order on a resin film layer. A specific method of production is as follows.

A primer layer forming resin composition B having the following composition was applied by the gravure reverse method on a resin film layer (having a thickness of 125 µm) made of an acrylic film, thereby to form a primer layer having a thickness of 1.5 µm. Subsequently, the aforementioned cured-layer forming resin composition 1 was applied onto the primer layer to a thickness of 3 µm, followed by curing with electron beam radiation at 10 Mrad to obtain a laminating sheet for use in organic glass (first lamination sheet) having the resin film layer, the primer layer, and the cured layer sequentially laminated.

<Primer Layer Forming Resin Composition B (Glass Transition Point being Lower than 100° C.)>

80 parts by mass of acrylic polymer polyol 20 parts by mass of urethane resin 10 parts by mass of hexamethylene diisocyanate 3.0 parts by mass of hydroxyphenyltriazine-based ultraviolet absorbent ("Tinuvin479" manufactured by BASF Japan Co., Ltd.)

1.8 parts by mass of hindered amine-based light stabilizer

Subsequently, the laminating sheet for use in organic glass obtained in the above was integrated with a polycarbonate base substrate by the injection-molding integration method. Specifically, the laminating sheet for use in organic glass was supplied and fixed between a pair of male and female molds (a movable mold and a fixed mold) in a mold-open state so that the surface on the resin film layer side would face towards the cavity side. Thereafter, the laminating sheet for use in organic glass was preliminarily molded by heating to 100° C. and softening the resin film layer of the laminating sheet for use in organic glass, performing vacuum suction from the mold side facing the cured layer side, and allowing the softened laminating sheet for use in organic glass to adhere closely along the shape of the movable mold. Subsequently, after the two molds were clamped, the polycarbonate resin in a fluidized state was injected into the cavity formed by the two molds so that the polycarbonate resin would fill the cavity and be solidified, thereby to laminate and integrate the formed polycarbonate base substrate and the laminating sheet for use in organic glass. Thereafter, the movable mold was separated from the fixed mold, thereby to obtain a laminate having the polycarbonate base substrate, the resin film layer, the primer layer, and the cured layer sequentially laminated.

Thereafter, under the same conditions as in Example 1, an inorganic oxide film made of silicon dioxide was formed on the cured layer of the laminate obtained in the above, thereby to obtain an organic glass laminate, except that the oxygen gas flow rate and the film-forming time at the time of forming the inorganic oxide film were changed to predetermined values shown in Table 1.

Examples 8 and 9

An organic glass laminate was produced under the same conditions as in Example 1 except that the cured layer was formed by using a cured-layer forming resin composition 4 having the following composition, and the oxygen gas flow rate and the film-forming time at the time of forming the inorganic oxide film were changed to predetermined values shown in Table 1.

<Cured-Layer Forming Resin Composition 4 (Glass Transition Point of 116° C. after Curing)>

Urethane acrylate oligomer (having a molecular weight of 2000): 46 parts by mass Scratch-resistant filler (silica particles, average particle size: about 30 nm): 54 parts by mass Hydroxyphenyltriazine-based ultraviolet absorbent ("Tinuvin479" manufactured by BASF Japan Co., Ltd.): 0.7 part by mass Light stabilizer having a reactive functional group (1,2, 2,6,6-pentamethyl-4-piperidinyl methacrylate, "SANOL LS-3410" manufactured by Nippon Nyukazai Co., Ltd.): 4.2 parts by mass Nonreactive silicone compound (polyether-modified silicone oil): 0.3 part by mass Examples 10-13

An organic glass laminate was produced under the same conditions as in Examples 8 and 9 except that the oxygen gas flow rate and the film-forming time at the time of forming the inorganic oxide film were changed to predetermined values shown in Table 1.

Example 15

A laminate having a polycarbonate base substrate, an adhesive layer, a primer layer, and a cured layer sequentially laminated was obtained under the same conditions as in Example 1. Thereafter, by the following method, an inorganic oxide film made of silicon dioxide was formed by a sputtering process on the cured layer of the laminate obtained in the above.

The laminate obtained in the above was placed in a chamber of a sputtering apparatus (manufactured by Anelva Corporation, type number: E-400). In order to measure a film thickness, a silicon wafer having a surface subjected to mirror finishing was placed together in a partially masked state. After the chamber was closed and the pressure was reduced to 1.0×10-4 Pa, a film was formed for 15 minutes by using silicon dioxide as a target and setting the flow rate of the Ar gas to be 30 sccm, the oxygen gas flow rate to be 10 sccm, the pressure at the time of film forming to be 0.5 Pa, and the electric discharge power (RF) to be 900 W. After the film-forming time had passed, the electric discharge was stopped, and the pressure was returned to atmospheric pressure. Thereafter, the formed support member was taken out from the chamber of the sputtering apparatus, thereby to obtain an organic glass laminate in which an inorganic oxide film made of silicon dioxide had been formed on the upper surface of the cured layer of the laminate obtained in the above.

The thickness of the obtained silicon dioxide film was confirmed by measuring the step difference between the part where the inorganic oxide film was present and the part where the inorganic oxide film was absent on the silicon wafer with use of a SURFCORDER ET4000L manufactured by Kosaka Laboratory Ltd.

Example 16

An organic glass laminate was produced under the same conditions as in Example 15 except that the cured layer was formed by using the cured-layer forming resin composition 4.

Example 17

The aforementioned cured-layer forming resin composition 1 was applied onto a release film layer (having a thickness of 75 μm) made of polyethylene terephthalate to a thickness of 3 μm, followed by curing with electron beam radiation at 10 Mrad to laminate a cured layer on the release film layer. Subsequently, a corona discharge treatment was carried out on the cured layer surface, and thereafter the aforementioned primer layer forming resin composition A was applied thereon by the gravure reverse method to form a primer layer having a thickness of 3 μm. Further, an ink composition for a colored layer (containing a mixture of 210 parts by weight of a black pigment: carbon black (having an average particle size of 24 nm), 100 parts by weight of a binder resin: vinyl chloride/vinyl acetate copolymer resin, and 100 parts by weight of an acrylic resin) was applied for three times in a superposing manner by the gravure direct method onto the primer layer to form a colored layer having a frame shape (shape having an aperture) with a longitudinal side of 170 mm, a lateral side of 100 mm, and a width of 20 mm (having a thickness of 5 μm). Further, a heat-fusion resin (acrylic resin) was applied onto the primer layer and the concealing layer by the gravure reverse method to form an adhesive layer having a thickness of 4 μm. Thus, a laminating sheet for use in organic glass (first transfer sheet) having the cured layer, the primer layer, the partially formed colored layer, and the adhesive layer laminated sequentially on the release film layer was obtained. Here, the OD value of the colored layer in the obtained first transfer sheet was measured by the aforementioned method with use of a transmission densitometer (D200-II, manufactured by GretagMacbeth GmbH), with a result that the OD value was 5.8.

An organic glass laminate was produced by performing injection-molding integration and forming an inorganic oxide film under the same conditions as in Example 1 with use of the first transfer sheet obtained in the above.

Example 18

An ink composition for a colored layer (containing a mixture of 210 parts by weight of a black pigment: carbon black (having an average particle size of 24 nm), 100 parts by weight of a binder resin: vinyl chloride/vinyl acetate copolymer resin, and 100 parts by weight of an acrylic resin) was applied for three times in a superposing manner by the gravure direct method onto a resin film layer made of an acrylic film (having a thickness of 125 μm), thereby to form a colored layer having a frame shape (shape having an aperture) with a longitudinal side of 170 mm, a lateral side of 100 mm, and a width of 20 mm (having a thickness of 5 μm). Further, the aforementioned primer layer forming resin composition B was applied onto the resin film layer and the colored layer by the gravure reverse method to form a primer layer having a thickness of 1.5 μm. Subsequently, the aforementioned cured-layer forming resin composition 1 was applied onto the primer layer to a thickness of 3 μm, followed by curing with electron beam radiation at 10 Mrad to obtain a laminating sheet for use in organic glass (first lamination sheet) having the resin film layer, the partially formed colored layer, the primer layer, and the cured layer sequentially laminated.

An organic glass laminate was produced by performing injection-molding integration and forming an inorganic oxide film under the same conditions as in Example 7 with use of the first lamination sheet obtained in the above.

Example 19

An organic glass laminate was produced by the second method with use of a laminating sheet for use in organic glass (second lamination sheet) having a primer layer, a cured layer, and an inorganic oxide film laminated in this order on a resin film layer. A specific method of production is as follows.

First, a sheet having a resin film layer, a primer layer, and a cured layer sequentially laminated was obtained. The sheet was produced under the same conditions as those of the first lamination sheet shown in Example 7.

An inorganic oxide film made of silicon dioxide was formed by a CVD process on the cured layer of the lamination sheet obtained in the above, thereby to obtain a laminating sheet for use in organic glass (second lamination sheet) having the resin film layer, the primer layer, the cured layer, and the inorganic oxide film sequentially laminated. The conditions of the CVD process were set to be the same as those of Example 7.

Subsequently, the laminating sheet for use in organic glass (second lamination sheet) obtained in the above was integrated with a polycarbonate base substrate by the injection-molding integration method. Specifically, the laminating sheet for use in organic glass was supplied and fixed between a pair of male and female molds (a movable mold and a fixed mold) in a mold-open state so that the surface on the resin film layer side would face towards the cavity side. Thereafter, the laminating sheet for use in organic glass was preliminarily molded by heating to 100° C. and softening the resin film layer of the laminating sheet for use in organic glass, performing vacuum suction from the mold side facing the inorganic oxide film side, and allowing the softened laminating sheet for use in organic glass to adhere closely along the shape of the movable mold. Subsequently, after the two molds were clamped, a polycarbonate resin in a fluidized state was injected into the cavity formed by the two molds so that the polycarbonate resin would fill the cavity and be solidified, thereby to laminate and integrate the formed polycarbonate base substrate and the laminating sheet for use in organic glass. Thereafter, the movable mold was separated from the fixed mold, thereby to obtain an organic glass laminate having the polycarbonate base substrate, the resin film layer, the primer layer, the cured layer, and the inorganic oxide film laminated in this order.

Example 20

First, a sheet having a resin film layer, a partially formed colored layer, a primer layer, and a cured layer sequentially laminated was obtained. The sheet was produced under the same conditions as those of the first lamination sheet shown in Example 18.

An inorganic oxide film made of silicon dioxide was formed by a CVD process on the cured layer of the sheet obtained in the above, thereby to obtain a laminating sheet for use in organic glass (second lamination sheet) having the resin film layer, the partially formed colored layer, the primer layer, the cured layer, and the inorganic oxide film sequentially laminated. The conditions of the CVD process were set to be the same as those of Example 19.

An organic glass laminate was produced by performing injection-molding integration under the same conditions as in Example 19 with use of the second lamination sheet obtained in the above.

Example 21

An organic glass laminate was produced by the second method with use of a laminating sheet for use in organic glass (second transfer sheet) having an inorganic oxide film, a cured layer, a primer layer, and an adhesive layer laminated in this order on a release film layer. A specific method of production is as follows.

An inorganic oxide film was formed by performing a CVD process on a release film layer made of polyethylene terephthalate (having a thickness of 75 µm) under the same conditions as in Example 1.

Subsequently, the crosslinking-curable resin composition 1 used in Example 1 was applied thereon to a thickness of 3 µm, followed by curing with electron beam radiation at 10 Mrad to form a cured layer. Thereafter, a corona discharge treatment was carried out on the cured layer surface, and the primer layer forming resin composition A used in Example 1 was applied thereon by the gravure reverse method to form a primer layer having a thickness of 3 µm. Further, a heat-fusion resin (acrylic resin) was applied onto the primer layer by the gravure reverse method to form an adhesive layer having a thickness of 4 µm. Thus, a laminating sheet for use in organic glass (second transfer sheet) having the release film layer, the inorganic oxide film, the cured layer, the primer layer, and the adhesive layer laminated in this order was obtained.

Subsequently, the laminating sheet for use in organic glass (second transfer sheet) obtained in the above was integrated with a polycarbonate base substrate by the injection-molding integration method. Specifically, the laminating sheet for use in organic glass was supplied and fixed between a pair of male and female molds (a movable mold and a fixed mold) in a mold-open state so that the surface on the adhesive layer side would face towards the cavity side. Thereafter, the laminating sheet for use in organic glass was preliminarily molded by heating to 100° C. and softening the laminating sheet for use in organic glass, performing vacuum suction from the mold side facing the release film layer side, and allowing the softened laminating sheet for use in organic glass to adhere closely along the shape of the movable mold. Subsequently, after the two molds were clamped, a polycarbonate resin in a fluidized state was injected into the cavity formed by the two molds so that the polycarbonate resin would fill the cavity and be solidified, thereby to laminate and integrate the formed polycarbonate base substrate and the laminating sheet for use in organic glass. Thereafter, the movable mold was separated from the fixed mold, and subsequently the release film layer was delaminated, thereby to obtain an organic glass laminate having the polycarbonate base substrate, the adhesive layer, the primer layer, the cured layer, and the inorganic oxide film laminated in this order.

Example 22

An organic glass laminate was produced by the second method with use of a laminating sheet for use in organic glass (second transfer sheet) having an inorganic oxide film, a cured layer, a primer layer, a partially formed colored layer, and an adhesive layer laminated in this order on a release film layer. A specific method of production is as follows.

An inorganic oxide film was formed by performing a CVD process on a release film layer made of polyethylene terephthalate (having a thickness of 75 µm) under the same conditions as in Example 1.

Subsequently, the crosslinking-curable resin composition 1 used in Example 1 was applied thereon to a thickness of 3 µm, followed by curing with electron beam radiation at 10 Mrad to form a cured layer. Thereafter, a corona discharge treatment was carried out on the cured layer surface, and the primer layer forming resin composition A used in Example 1 was applied thereon by the gravure reverse method to form a primer layer having a thickness of 3 µm. Further, an ink composition for a colored layer (containing a mixture of 210 parts by weight of a black pigment: carbon black (having an average particle size of 24 nm), 100 parts by weight of a binder resin: vinyl chloride/vinyl acetate copolymer resin, and 100 parts by weight of an acrylic resin) was applied for three times in a superposing manner by the gravure direct method onto the primer layer to form a colored layer having a frame shape (shape having an aperture) with a longitudinal side of 170 mm, a lateral side of 100 mm, and a width of 20 mm (having a thickness of 5 μm). Further, a heat-fusion resin (acrylic resin) was applied onto the primer layer and the colored layer by the gravure reverse method to form an adhesive layer having a thickness of 4 μm. Thus, a laminating sheet for use in organic glass (second transfer sheet) having the release film layer, the inorganic oxide film, the cured layer, the primer layer, the partially formed colored layer, and the adhesive layer laminated in this order was obtained.

An organic glass laminate was produced by performing injection-molding integration under the same conditions as in Example 21 with use of the second transfer sheet obtained in the above.

Comparative Example 1

An organic glass laminate was produced under the same conditions as in Example 1 except that the inorganic oxide film was not formed.

Comparative Examples 2 and 3

An organic glass laminate was produced under the same conditions as in Example 1 except that the oxygen gas flow rate and the film-forming time at the time of forming the inorganic oxide film were changed to predetermined values shown in Table 2.

Comparative Examples 4-8

An organic glass laminate was produced under the same conditions as in Example 8 except that the oxygen gas flow rate and the film-forming time at the time of forming the inorganic oxide film were changed to predetermined values shown in Table 2.

Comparative Example 9

An organic glass laminate was produced under the same conditions as in Example 7 except that the cured layer was formed by using a cured-layer forming resin composition 5 having the following composition, and that the inorganic oxide film was not formed.
<Cured-Layer Forming Resin Composition 5 (Glass Transition Point of 36° C. after Curing)>
  Bifunctional polycarbonate acrylate (weight-average molecular weight: 10,000): 94 parts by mass
  Hexafunctional urethane acrylate (weight-average molecular weight: 6,000): 6 parts by mass
  Triazine-based ultraviolet absorbent: 5 parts by mass ("TINUVIN479 (trade name)", manufactured by BASF Japan Co., Ltd.)
  Electron beam reactive hindered amine-based light stabilizer: 5 parts by mass ("SANOL LS-3410 (trade name)", manufactured by BASF Japan Co., Ltd.)

Comparative Example 10

An organic glass laminate was produced under the same conditions as in Example 7 except that the cured layer was formed by using the aforementioned cured-layer forming resin composition 5, and that the oxygen gas flow rate and the film-forming time at the time of forming the inorganic oxide film were changed to predetermined values shown in Table 2.

Comparative Example 11

A polycarbonate base substrate having a thickness of 3 mm was fabricated by injection molding of a polycarbonate resin by a method similar to that of Example 1 except that the laminating sheet for use in organic glass was not set.

Subsequently, an acryl-based primer containing polymethyl methacrylate (PMMA) (trade name "SHP470", manufactured by Momentive Performance Materials Inc.) was applied onto the polycarbonate base substrate by the spin coating method so that the thickness after drying would be 2 μm, followed by drying at 120° C. for 30 minutes in a hot-air circulating dryer to form a primer layer. Further, a silicone-based hard-coating liquid to which an ultraviolet absorbent had been added so that the content of the ultraviolet absorbent would be 6.5 parts by mass relative to 100 parts by mass of the resin (trade name "AS4700", manufactured by Momentive Performance Materials Inc.; containing polydimethylsiloxane and colloidal silica) was applied onto the primer layer by the spin coating method so that the thickness after heating would be 6 μm, followed by heating at 120° C. for 60 minutes in a hot-air circulating dryer to form a cured layer, thereby to obtain an organic glass laminate having the polycarbonate base substrate, the primer layer, and the cured layer laminated in this order.

Comparative Example 12

An inorganic oxide film made of silicon dioxide was formed by a CVD process on the cured layer of the organic glass laminate obtained in Comparative Example 11, thereby to obtain an organic glass laminate having the polycarbonate base substrate, the primer layer, the cured layer, and the inorganic oxide film laminated in this order. The conditions of the CVD process were set to be the same as those of Example 1 except that the oxygen gas flow rate and the film-forming time at the time of forming the film were changed to predetermined values shown in Table 2.

Comparative Example 13

A polycarbonate base substrate was obtained under the conditions shown in Comparative Example 11. An acryl-based primer was applied onto the obtained polycarbonate base substrate by the spin coating method so that the film thickness after heating would be 4 μm, followed by heating at 120° C. for 30 minutes in a hot-air circulating dryer to form a primer layer. Further, a silicone-based hard-coating liquid that did not contain an ultraviolet absorbent was applied onto the primer layer by the spin coating method so that the film thickness after curing would be 4 μm, followed by heating at 120° C. for 60 minutes in a hot-air circulating dryer to form a cured layer. Thus, an organic glass laminate having the polycarbonate base substrate, the acrylic resin layer, and the cured layer laminated in this order was obtained.

Comparative Example 14

An inorganic oxide film made of silicon dioxide was formed by a CVD process on the cured layer of the organic glass laminate obtained in Comparative Example 13, thereby to obtain an organic glass laminate having the polycarbonate base substrate, the primer layer, the cured layer, and the inorganic oxide film laminated in this order. The conditions of the CVD process were set to be the same as those of Example 1 except that the oxygen gas flow rate and the film-forming time at the time of forming the film were changed to predetermined values shown in Table 2.

Comparative Example 15

An organic glass laminate was produced under the same conditions as in Example 1 except that the cured layer was formed by using the following cured-layer forming resin composition 6, that the primer layer was formed by using the following primer layer forming resin composition C, and that the oxygen gas flow rate and the film-forming time at the time of forming the inorganic oxide film were changed to predetermined values shown in Table 2.
<Cured-layer Forming Resin Composition 6 (Glass Transition Point of 91° C. after Curing)>
Hexafunctional urethane acrylate (having a molecular weight of about 1,000): 60 parts by mass
Bifunctional caprolactone-modified urethane acrylate (having a molecular weight of about several thousands): 40 parts by mass
Nonreactive silicone compound (polyether-modified silicone oil): 0.3 part by mass
Scratch-resistant filler (silica particles, average particle size: 2 μm): 2 parts by mass
<Primer Layer Forming Resin Composition C (Glass Transition Point of 36° C.)>
Polycarbonate-based urethane acryl copolymer*1: 100 parts by mass
Antiblocking agent*2: 9 parts by mass
Curing agent (hexamethylene diisocyanate): 25 parts by mass

*1: In the polycarbonate-based urethane acryl copolymer that was put to use, the content of the urethane component was 30% by mass, and the weight-average molecular weight was 50000.

*2: Silica particles, average particle size: 3 μm

2. Performance Evaluation of Organic Glass Laminate (Adhesion, Abrasion Resistance, Weather Resistance, High-temperature Water Resistance)
(Adhesion)

A cut was made in a checkerboard-pattern in the surface of the inorganic oxide film or the cured layer of each organic glass laminate according to JIS K5400 by setting the cutting depth to be 1 mm, and a checkerboard-pattern tape delamination test was carried out by using a cellophane tape (CT405AP-24) manufactured by Nichiban Co., Ltd. The presence or absence of delamination of the inorganic oxide film or the cured layer from the organic glass laminate was observed.
(Abrasion Resistance)

In accordance with ASTM D1044-08E1, a Taber abrasion test was carried out by using CS-10F as an abrasion wheel under conditions with 50 rpm and 500 g load and setting the rotation number to be 500. The haze was measured at four sites of each organic glass laminate before and after the Taber abrasion test by using a hazemeter (NDH-2000 manufactured by Nippon Denshoku Industries Co., Ltd.) according to the method described in JIS K7136, and an average value thereof was determined. The haze difference (ΔH) before and after the Taber abrasion test was determined by subtracting the haze obtained before the Taber abrasion test from the haze obtained after the Taber abrasion test. In the case in which the haze difference (ΔH) is 5 or below, it is determined that the organic glass laminate can be put to practical use as an exterior member because the organic glass laminate is provided with sufficient abrasion resistance.
(Weather Resistance)

With respect to each organic glass laminate immediately after preparation, by using an accelerated weathering tester (SUV-W23, manufactured by Iwasaki Electric Co., Ltd.), a total sum of 33 cycles were carried out, with one cycle being under the conditions of (1) ultraviolet ray being radiated at 60 mW/cm², 63° C., and 50 RH % for 20 hours, (2) in darkness at 30° C. and 98 RH % for 4 hours, and (3) water being sprayed for 30 seconds before and after the conditions (2).

With respect to each organic glass laminate before and after the weather resistance test, the haze was measured by using a hazemeter (NDH-2000 manufactured by Nippon Denshoku Industries Co., Ltd.) according to the method described in JIS K7136. The haze difference (ΔH) before and after the weather resistance test was determined by subtracting the haze obtained before the weather resistance test from the haze obtained after the weather resistance test. In the case in which the haze difference (ΔH) is 10 or below, it is determined that the organic glass laminate can be put to practical use as an exterior member because the organic glass laminate is provided with sufficient weather resistance.

Further, the yellow index (YI) of each organic glass laminate was measured before and after the accelerated weathering test, and the difference of the yellow index (ΔYI) was determined by subtracting the yellow index obtained before the accelerated weathering test from the yellow index obtained after the accelerated weathering test. In the case in which the difference of the yellow index (ΔYI) is 10 or below, it is determined that the organic glass laminate can be put to practical use as an exterior member because the organic glass laminate is provided with sufficient weather resistance. Here, the yellow index was measured by using a spectrophotometer (UV-2550, manufactured by Shimadzu Corporation) and measuring in a transmission mode with a C light source and a viewing angle set to be 2° according to the "Method for testing the yellowness degree and the yellowing degree of plastics" of JIS K 7103.
(High-temperature Water Resistance)

Each organic glass laminate was immersed into boiling water for 3 hours. Subsequently, after the water on each organic glass laminate was sufficiently wiped off, a checkerboard-pattern tape delamination test was carried out by the same method as described above, and the presence or absence of delamination of the inorganic oxide film or the cured layer from the organic glass laminate was observed.
(Evaluation Results)

The obtained results are shown in Tables 1 and 2. As will be clear from these results, it has been found out that an organic glass laminate having a cured layer and an inorganic oxide film disposed on an organic glass base substrate is provided with excellent weather resistance and abrasion resistance when the cured layer is formed of a cured product of a resin composition containing a curable resin and an ultraviolet absorbent; the glass transition point of the cured product satisfies a range of 80-160° C.; and the inorganic oxide film has a thickness of 0.01 μm or more and less than 0.5 μm.

Also, regarding the organic glass laminates in which a colored layer was partially provided (Examples 17, 18, 20, and 22), interlayer delamination did not occur at the part where the colored layer was disposed, so that, in view of adhesion, abrasion resistance, and weather resistance, the same tendency as in the case in which the colored layer was not provided was recognized (not shown in Table 1), and it has also been confirmed that the colored layer does not cause adverse effects on the adhesion, abrasion resistance, and weather resistance.

TABLE 1

| | Film-forming conditions of inorganic oxide film | | | | Cured layer | | Primer-layer | |
|---|---|---|---|---|---|---|---|---|
| | O₂ flow rate (sccm) | Thickness (nm) | Film-forming time (minutes) | Resin composition put to use | Glass transition point | Amount of adding ultraviolet absorbent (ratio per 100 parts by mass of resin: parts by weight) | Glass transition point | Amount of adding ultraviolet absorbent (ratio per 100 parts by mass of binder resin: parts by weight) |
| Example 1 | 2.0 | 88 | 5 | Resin composition 1 | 91° C. | 0.7 | 36° C. | 29 |
| Example 2 | 2.0 | 134 | 5 | Resin composition 1 | 91° C. | 0.7 | 36° C. | 29 |
| Example 3 | 2.0 | 475 | 30 | Resin composition 1 | 91° C. | 0.7 | 36° C. | 29 |
| Example 4 | 5.0 | 102 | 5 | Resin composition 1 | 91° C. | 0.7 | 36° C. | 29 |
| Example 5 | 5.0 | 100 | 5 | Resin composition 2 | 95° C. | 2.0 | 36° C. | 29 |
| Example 6 | 5.0 | 100 | 5 | Resin composition 3 | 146° C. | 2.3 | 36° C. | 29 |
| Example 7 | 5.0 | 129 | 5 | Resin composition 1 | 91° C. | 0.7 | <100° C. | 3 |
| Example 8 | 5.0 | 41 | 2.5 | Resin composition 4 | 116° C. | 1.5 | 36° C. | 29 |
| Example 9 | 5.0 | 98 | 5 | Resin composition 4 | 116° C. | 1.5 | 36° C. | 29 |
| Example 10 | 5.0 | 406 | 30 | Resin composition 4 | 116° C. | 1.5 | 36° C. | 29 |
| Example 11 | 50.0 | 91 | 5 | Resin composition 4 | 116° C. | 1.5 | 36° C. | 29 |
| Example 12 | 50.0 | 288 | 15 | Resin composition 4 | 116° C. | 1.5 | 36° C. | 29 |
| Example 13 | 2.0 | 460 | 30 | Resin composition 4 | 116° C. | 1.5 | 36° C. | 29 |
| Example 14 | 5.0 | 434 | 30 | Resin composition 1 | 91° C. | 0.7 | 36° C. | 29 |
| Example 15 | 10.0 | 100 | 15 | Resin composition 1 | 91° C. | 0.7 | 36° C. | 29 |
| Example 16 | 10.0 | 100 | 15 | Resin composition 4 | 116° C. | 1.5 | 36° C. | 29 |

| | Adhesion Presence or absence of delamination | Abrasion resistance | | Weather resistance | | | High-temperature water resistance |
|---|---|---|---|---|---|---|---|
| | | Haze before test | Haze difference before and after test (ΔH) | Haze difference before and after test (ΔH) | Yellow index difference before and after test (ΔYI) | Presence or absence of delamination or color of outer appearance | Presence or absence of delamination or color of outer appearance |
| Example 1 | No delamination present | 1.7 | 3.2 | 9.0 | 1.5 | No delamination present | No delamination present |
| Example 2 | No delamination present | 1.7 | 3.1 | Not carried out | Not carried out | Not carried out | No delamination present |
| Example 3 | No delamination present | 2.4 | 1.8 | Not carried out | Not carried out | Not carried out | No delamination present |
| Example 4 | No delamination present | 1.9 | 1.4 | 4.0 | 2.3 | No delamination present | No delamination present |
| Example 5 | No delamination present | 2.8 | 3.3 | 5.1 | 0.7 | No delamination present | No delamination present |
| Example 6 | No delamination present | 3.4 | 3.8 | 0.2 | 0.5 | No delamination present | No delamination present |
| Example 7 | No delamination present | 1.7 | 4.1 | 4.2 | 2.1 | No delamination present | No delamination present |
| Example 8 | No delamination present | 1.6 | 3.0 | Not carried out | Not carried out | Not carried out | No delamination present |
| Example 9 | No delamination present | 1.6 | 3.8 | Not carried out | Not carried out | Not carried out | No delamination present |
| Example 10 | No delamination present | 1.8 | 4.5 | Not carried out | Not carried out | Not carried out | No delamination present |
| Example 11 | No delamination present | 1.9 | 2.5 | Not carried out | Not carried out | Not carried out | No delamination present |

TABLE 1-continued

| | | | | | | | | |
|---|---|---|---|---|---|---|---|---|
| Example 12 | No delamination present | 1.7 | 2.2 | Not carried out | Not carried out | Not carried out | No delamination present |
| Example 13 | No delamination present | 1.6 | 1.7 | Not carried out | Not carried out | Not carried out | No delamination present |
| Example 14 | No delamination present | 3.3 | 2.3 | Not carried out | Not carried out | Not carried out | No delamination present |
| Example 15 | No delamination present | 0.7 | 4.9 | Not carried out | Not carried out | Not carried out | Not carried out |
| Example 16 | No delamination present | 0.7 | 3.8 | Not carried out | Not carried out | Not carried out | Not carried out |

TABLE 2

| | Film-forming conditions of inorganic oxide film | | | Cured layer | | | Primer layer | |
|---|---|---|---|---|---|---|---|---|
| | $O_2$ flow rate (sccm) | Thickness (nm) | Film-forming time (minutes) | Resin composition put to use | Glass transition point | Amount of adding ultraviolet absorbent (ratio per 100 parts by mass of resin: parts by weight) | Glass transition point | Amount of adding ultraviolet absorbent (ratio per 100 parts by mass of binder resin: parts by weight) |
| Comparative Example 1 | With no inorganic oxide film | | | Resin composition 1 | 91° C. | 0.7 | 36° C. | 29 |
| Comparative Example 2 | 2.0 | 764 | 60 | Resin composition 1 | 91° C. | 0.7 | 36° C. | 29 |
| Comparative Example 3 | 5.0 | 868 | 60 | Resin composition 1 | 91° C. | 0.7 | 36° C. | 29 |
| Comparative Example 4 | 5.0 | 795 | 30 | Resin composition 4 | 116° C. | 1.5 | 36° C. | 29 |
| Comparative Example 5 | 5.0 | 1387 | 60 | Resin composition 4 | 116° C. | 1.5 | 36° C. | 29 |
| Comparative Example 6 | 50.0 | 515 | 30 | Resin composition 4 | 116° C. | 1.5 | 36° C. | 29 |
| Comparative Example 7 | 50.0 | 844 | 45 | Resin composition 4 | 116° C. | 1.5 | 36° C. | 29 |
| Comparative Example 8 | 50.0 | 1211 | 60 | Resin composition 4 | 116° C. | 1.5 | 36° C. | 29 |
| Comparative Example 9 | With no inorganic oxide film | | | Resin composition 5 | 36° C. | 5.0 | <100° C. | 3 |
| Comparative Example 10 | 2.0 | 111 | 5 | Resin composition 5 | 36° C. | 5.0 | <100° C. | 3 |
| Comparative Example 11 | With no inorganic oxide film | | | Silicone | 200° C. or higher | 0.8 | Not measured | 6.5 |
| Comparative Example 12 | 2.0 | 2200 | 180 | Silicone | 200° C. or higher | 0.8 | Not measured | 6.5 |
| Comparative Example 13 | With no inorganic oxide film | | | Silicone | 200° C. or higher | 0.6-0.8 | Not measured | 5-8 |
| Comparative Example 14 | 2.0 | 100 | 5 | Silicone | 200° C. or higher | 0.6-0.8 | Not measured | 5-8 |
| Comparative Example 15 | 5.0 | 102 | 5 | Resin composition 6 | 91° C. | 0 | 36° C. | 0 |

| | Abrasion resistance | | | Weather resistance | | | High-temperature water resistance |
|---|---|---|---|---|---|---|---|
| | Adhesion Presence or absence of delamination | Haze before test | Haze difference before and after test ($\Delta H$) | Haze difference before and after test ($\Delta H$) | Yellow index difference before and after test ($\Delta YI$) | Presence or absence of delamination or color of outer appearance | Presence or absence of delamination or color of outer appearance |
| Comparative Example 1 | No delamination present | 1.8 | 8.0 | 64.0 | 4.4 | Whitening accrued | No delamination present |
| Comparative Example 2 | Delamination present | 2.0 | 1.9 | Not carried out | Not carried out | Not carried out | Delamination present |
| Comparative Example 3 | Delamination present | 2.0 | 7.1 | Not carried out | Not carried out | Not carried out | Delamination present |
| Comparative Example 4 | Delamination present | 2.1 | 4.0 | Not carried out | Not carried out | Not carried out | Delamination present |
| Comparative Example 5 | Delamination present | 1.9 | 3.8 | Not carried out | Not carried out | Not carried out | Delamination present |
| Comparative Example 6 | Delamination partially present | 1.8 | 4.2 | Not carried out | Not carried out | Not carried out | Delamination partially present |
| Comparative Example 7 | Delamination partially present | 1.7 | 3.7 | Not carried out | Not carried out | Not carried out | Delamination present |

TABLE 2-continued

| | | | | | | | |
|---|---|---|---|---|---|---|---|
| Comparative Example 8 | Delamination partially present | 2.0 | 3.8 | Not carried out | Not carried out | Not carried out | Delamination present |
| Comparative Example 9 | No delamination present | 1.2 | 10.0 | 0.7 | 0.5 | No delamination present | Whitening occurred |
| Comparative Example 10 | No delamination present | 7.6 | −2.5 | −3.5 | 0.2 | No delamination present | Whitening occurred |
| Comparative Example 11 | No delamination present | 1.0 | 7.1 | 7.8 | 23.5 | Delamination present, and yellowing occurred | Delamination present |
| Comparative Example 12 | No delamination present | 0.3 | <2 | 8.4[#1] | 11.44[#1] | Delamination present, and yellowing occurred | Delamination present |
| Comparative Example 13 | No delamination present | 0.1 | 2.8 | 3.1 | 0.9 | Delamination present | Delamination present |
| Comparative Example 14 | No delamination present | 0.2 | 1.0 | 26.5 | 0.0 | Delamination present | Delamination present |
| Comparative Example 15 | No delamination present | 1.9 | 1.4 | 31.6 | 38.6 | Yellowing occurred | No delamination present |

[#1] Measurement results after 25 cycles are shown.

3. Performance Evaluation of Organic Glass Laminate (Property of Following a Bending Process)

By the following method, evaluation was made on the property of following a bending process with respect to the organic glass laminates of Example 1 and Comparative Examples 1 and 11. Each of the organic glass laminates was heated at 160° C. for 3 minutes in a hot-air circulating dryer. Thereafter, each of the heated organic glass laminates was pressed against a mold having a semi-cylindrical shape (like a shape obtained by longitudinally cutting a circular cylinder), and a bending process was carried out so as to attain a radius of curvature of 1000 mm.

The results of observation on the surface of each of the bent organic glass laminates are shown in Table 3. As is shown in Table 3, the organic glass laminate of Example 1 was excellent in the property of following a bending process because no cracks were generated on the surface after the bending. Also, the organic glass laminate of Comparative Example 1 that had a cured layer formed of a cured product having a glass transition point within a range of 80-160° C. was provided with an excellent property of following a bending process. On the other hand, the organic glass laminate of Comparative Example 11 that had a cured layer formed of a cured product having a glass transition point exceeding 160° C. was inferior in the property of following a bending process because cracks were recognized on the surface after the bending.

TABLE 3

| | Surface state after bending process |
|---|---|
| Example 1 | No generation of cracks was recognized, and the surface state was good. |
| Comparative Example 1 | No generation of cracks was recognized, and the surface state was good. |
| Comparative Example 11 | Generation of cracks was recognized in the cured layer, and the product was in a state of being impracticable. |

DESCRIPTION OF REFERENCE SIGNS

1: Organic glass base substrate
2: Cured layer
3: Inorganic oxide film
4: Primer layer
5: Adhesive layer
6: Resin film layer
7: Release film layer
8: Release layer
9: Colored layer

The invention claimed is:

1. An organic glass laminate used as an exterior member, the organic glass laminate having at least an organic glass base substrate, a cured layer, and an inorganic oxide film in this order, the cured layer being formed of a cured product of a resin composition containing a curable resin and an ultraviolet absorbent, wherein the thickness of the organic glass base substrate is 0.8 mm or more, the cured product has a glass transition point of 80-160° C., and the inorganic oxide film has a thickness of 0.01 μm or more and less than 0.5 μm.

2. The organic glass laminate according to claim 1, wherein the curable resin is an ionizing-radiation-curable resin containing (i) a tri-or more functional (meth)acrylate and (ii) a bifunctional (meth)acrylate.

3. The organic glass laminate according to claim 1, wherein the cured layer contains filler particles at 20-70% by mass.

4. The organic glass laminate according to claim 1, wherein the cured layer has a thickness of 1-10 μm.

5. The organic glass laminate according to claim 1, wherein the resin composition contains the ultraviolet absorbent at 0.5-10 parts by mass per 100 parts by mass of a total amount of the ionizing-radiation-curable resin.

6. The organic glass laminate according to claim 1, further having an adhesive layer and a primer layer in this order, as viewed from the organic glass base substrate side, between the organic glass base substrate and the cured layer, wherein the glass transition point of the primer layer is lower than the glass transition point of the cured product constituting the cured layer.

7. The organic glass laminate according to claim 1, further having a colored layer that has been partially formed between the organic glass base substrate and the inorganic oxide film.

8. A laminating sheet for producing the organic glass laminate according to claim 1, wherein, the laminating sheet comprising
- at least a cured layer is laminated on a base material film,
- the cured layer is formed of a cured product of a resin composition containing a curable resin and an ultraviolet absorbent, and
- the cured product has a glass transition point of 80-160° C.

9. The laminating sheet according to claim 8, wherein the base material film is a release film layer capable of being released from the cured layer, and the laminating sheet transfers the cured layer onto the organic glass base substrate.

10. The laminating sheet according to claim 8, wherein the base material film is a transparent resin film layer, and the laminating sheet is used by laminating the laminating sheet onto the organic glass base substrate.

11. Use of a laminating sheet for producing the organic glass laminate according to claim 1, wherein, the laminating sheet comprising
- at least a cured layer is laminated on a base material film,
- the cured layer is formed of a cured product of a resin composition containing a curable resin and an ultraviolet absorbent, and
- the cured product has a glass transition point of 80-160° C.

12. A laminating sheet for producing the organic glass laminate according to claim 1, wherein, the laminating sheet comprising
- at least a cured layer and an inorganic oxide film are laminated on a base material film,
- the cured layer is formed of a cured product of a resin composition containing a curable resin and an ultraviolet absorbent,
- the cured product has a glass transition point of 80-160° C., and
- the inorganic oxide film has a thickness of 0.01 μm or more and less than 0.5 μm.

13. The laminating sheet according to claim 12, wherein
- the base material film is a release film layer capable of being released from the inorganic oxide film,
- at least the inorganic oxide film and the cured layer are laminated in this order on the release film layer, and
- the laminating sheet is used for transferring the cured layer and the inorganic oxide film onto the organic glass base substrate.

14. The laminating sheet according to claim 12, wherein
- the base material film is a transparent resin film layer,
- at least the inorganic oxide film and the cured layer are laminated on the resin film layer, and
- the laminating sheet is used by laminating the laminating sheet itself onto the organic glass base substrate.

15. Use of a laminating sheet for producing the organic glass laminate according to claim 1, wherein, the laminating sheet comprising
- at least a cured layer and an inorganic oxide film are laminated on a base material film,
- the cured layer is formed of a cured product of a resin composition containing a curable resin and an ultraviolet absorbent,
- the cured product has a glass transition point of 80-160° C., and
- the inorganic oxide film has a thickness of 0.01 μm or more and less than 0.5 μm.

16. A method of producing an organic glass laminate, comprising:
- a step 1 of laminating at least a cured layer onto an organic glass base substrate by using the laminating sheet according to claim 8; and
- a step 2 of forming an inorganic oxide film having a thickness of 0.01 μm or more and less than 0.5 μm on the cured layer that has been laminated on the organic glass base substrate.

17. A method of producing an organic glass laminate, comprising a step of laminating at least a cured layer and an inorganic oxide film in this order onto an organic glass base substrate by using the laminating sheet according to claim 12.

18. The organic glass laminate according to claim 2, wherein the cured layer contains filler particles at 20-70% by mass.

19. The organic glass laminate according to claim 2, wherein the cured layer has a thickness of 1-10 μm.

20. The organic glass laminate according to claim 3, wherein the cured layer has a thickness of 1-10 μm.

* * * * *